US012755743B2

(12) United States Patent
Liu et al.

(10) Patent No.: US 12,755,743 B2
(45) **Date of Patent: *Oct. 6, 2026**

(54) MULTI-CHANNEL SIGNAL ENCODING METHOD, MULTI-CHANNEL SIGNAL DECODING METHOD, ENCODER, AND DECODER

(71) Applicant: Huawei Technologies Co., Ltd., Shenzhen (CN)

(72) Inventors: Zexin Liu, Shenzhen (CN); Lei Miao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 149 days.

This patent is subject to a terminal disclaimer.

(21) Appl. No.: 18/928,904

(22) Filed: Oct. 28, 2024

(65) Prior Publication Data

US 2025/0124932 A1 Apr. 17, 2025

Related U.S. Application Data

(63) Continuation of application No. 18/393,866, filed on Dec. 22, 2023, now Pat. No. 12,154,578, which is a (Continued)

(30) Foreign Application Priority Data

Mar. 31, 2017 (CN) ........................ 201710205821.2

(51) Int. Cl.
*G10L 19/008* (2013.01)
*G10L 19/02* (2013.01)
*G10L 19/032* (2013.01)

(52) U.S. Cl.
CPC ........ *G10L 19/008* (2013.01); *G10L 19/0204* (2013.01); *G10L 19/032* (2013.01)

(58) Field of Classification Search
CPC .. G10L 19/008; G10L 19/0204; G10L 19/032
See application file for complete search history.

(56) References Cited

U.S. PATENT DOCUMENTS 7,756,713 B2 7/2010 Chong et al.
7,758,713 B2 7/2010 Morlacchi
(Continued)

FOREIGN PATENT DOCUMENTS

CN 101149925 A 3/2008
CN 101166377 A 4/2008
(Continued)

OTHER PUBLICATIONS

Purnhagen, H., et al., "Synthetic Ambience in Parametric Stereo Coding," Audio Engineering Society, 116th Convention, Convention Paper, May 8-11, 2004, 13 pages.
(Continued)

*Primary Examiner* — Nicole A K Schmieder
(74) *Attorney, Agent, or Firm* — Conley Rose, P.C.

(57) ABSTRACT

A multi-channel signal encoding method includes determining a downmixed signal of a first channel signal and a second channel signal, determining an initial reverberation gain parameter of the first channel signal and the second channel signal, determining a target reverberation gain parameter of the first channel signal and the second channel signal based on a correlation between the first channel signal and the downmixed signal, a correlation between the second channel signal and the downmixed signal, and the initial reverberation gain parameter, quantizing the first channel signal and the second channel signal based on the downmixed signal and the target reverberation gain parameter, and writing a quantized first channel signal and a quantized second channel signal into a bitstream.

20 Claims, 10 Drawing Sheets

Related U.S. Application Data continuation of application No. 17/837,558, filed on Jun. 10, 2022, now Pat. No. 11,894,001, which is a continuation of application No. 16/586,128, filed on Sep. 27, 2019, now Pat. No. 11,386,907, which is a continuation of application No. PCT/CN2018/077782, filed on Mar. 1, 2018.

(56) References Cited

U.S. PATENT DOCUMENTS

| | | | |
|---|---|---|---|
| 8,073,702 | B2 | 12/2011 | Pang et al. |
| 9,685,167 | B2 | 6/2017 | Seo et al. |
| 9,715,880 | B2 | 7/2017 | Friedrich et al. |
| 11,386,907 | B2 | 7/2022 | Liu et al. |
| 2007/0233293 | A1 | 10/2007 | Villemoes et al. |
| 2008/0262854 | A1 | 10/2008 | Jung et al. |
| 2009/0129601 | A1 | 5/2009 | Ojala et al. |
| 2009/0182564 | A1 | 7/2009 | Beack et al. |
| 2009/0222272 | A1 | 9/2009 | Seefeldt et al. |
| 2010/0153119 | A1 | 6/2010 | Lee et al. |
| 2010/0169099 | A1 | 7/2010 | Ashley et al. |
| 2010/0198602 | A1 | 8/2010 | Oh et al. |
| 2011/0166867 | A1 | 7/2011 | Seo et al. |
| 2011/0173005 | A1 | 7/2011 | Hilpert et al. |
| 2011/0178806 | A1 | 7/2011 | Shirakawa et al. |
| 2011/0182432 | A1 | 7/2011 | Ishikawa et al. |
| 2011/0211702 | A1 | 9/2011 | Mundt et al. |
| 2011/0284672 | A1 | 11/2011 | Baker |
| 2012/0259643 | A1 | 10/2012 | Engdegard et al. |
| 2012/0265543 | A1 | 10/2012 | Lang et al. |
| 2013/0006618 | A1 | 1/2013 | Toguri et al. |
| 2013/0064377 | A1 | 3/2013 | Lee et al. |
| 2014/0161269 | A1 | 6/2014 | Togawa et al. |
| 2015/0371644 | A1 | 12/2015 | Par |
| 2016/0255453 | A1 | 9/2016 | Fueg et al. |
| 2017/0272885 | A1 | 9/2017 | Villemoes |
| 2020/0027466 | A1 | 1/2020 | Liu et al. |

FOREIGN PATENT DOCUMENTS

| | | | |
|---|---|---|---|
| CN | 101297353 | A | 10/2008 |
| CN | 101356573 | A | 1/2009 |
| CN | 101410889 | A | 4/2009 |
| CN | 101410890 | A | 4/2009 |
| CN | 101460997 | A | 6/2009 |
| CN | 101572088 | A | 11/2009 |
| CN | 101673548 | A | 3/2010 |
| CN | 102157151 | A | 8/2011 |
| CN | 102171754 | A | 8/2011 |
| CN | 102272829 | A | 12/2011 |
| CN | 102307323 | A | 1/2012 |
| CN | 102349108 | A | 2/2012 |
| CN | 103258538 | A | 8/2013 |
| CN | 103700372 | A | 4/2014 |
| CN | 103854656 | A | 6/2014 |
| CN | 104995915 | A | 10/2015 |
| CN | 105405445 | A | 3/2016 |
| CN | 108665902 | A | 10/2018 |
| EP | 1768107 | A1 | 3/2007 |
| EP | 1921605 | A1 | 5/2008 |
| EP | 2840811 | A1 | 2/2015 |
| ES | 2531422 | T3 | 3/2015 |
| JP | 2007025290 | A | 2/2007 |
| JP | 2011150084 | A | 8/2011 |
| JP | 2011197105 | A | 10/2011 |
| JP | 2011527456 | A | 10/2011 |
| KR | 20080066538 | A | 7/2008 |
| KR | 20130029254 | A | 3/2013 |
| WO | 2005101370 | A1 | 10/2005 |
| WO | 2006003891 | A1 | 1/2006 |
| WO | 2010070016 | A1 | 6/2010 |
| WO | 2012105885 | A1 | 8/2012 |

OTHER PUBLICATIONS

Suresh, K., et al.,"MDCT Domain Parametric Stereo Audio Coding," College of Engineering, Thiruvananthapuram, 695016, India, Signal Processing and Communications (SPCOM), 2012 International Conference, Jul. 2012, 4 pages.

Xuan-Peng, L., et al., "Tereo Coding Based on Spatial Perceptual Information," Southeast University, Mar. 2006, 56 pages.

MULTI-CHANNEL SIGNAL ENCODING METHOD, MULTI-CHANNEL SIGNAL DECODING METHOD, ENCODER, AND DECODER

CROSS-REFERENCE TO RELATED APPLICATIONS

This is a continuation of U.S. patent application Ser. No. 18/393,866, filed on Dec. 22, 2023, now U.S. Pat. No. 12,154,578, which is a continuation of U.S. patent application Ser. No. 17/837,558, filed on Jun. 10, 2022, now U.S. Pat. No. 11,894,001, which is a continuation of U.S. patent Application Ser. No. 16/586,128, filed on Sep. 27, 2019, now U.S. Pat. No. 11,386,907, which is a continuation of International Patent Application No. PCT/CN2018/077782 filed on Mar. 1, 2018, which claims priority to Chinese Patent Application No. 201710205821.2, filed on Mar. 31, 2017. All of the aforementioned patent applications are hereby incorporated by reference in their entireties.

TECHNICAL FIELD

This application relates to the audio encoding field, and more specifically, to a multi-channel signal encoding method, a multi-channel signal decoding method, an encoder, and a decoder.

BACKGROUND

As living quality is improved, people have increasing demands on high-quality audio. Compared with mono audio, stereo audio provides a sense of orientation and a sense of distribution for each acoustic source, and provides improved clarity, intelligibility, and on-site feeling of sound. Therefore, stereo audio is very popular.

Stereo processing technologies mainly include mid/side (MS) encoding, intensity stereo (IS) encoding, parametric stereo (PS) encoding, and the like.

When PS encoding is used to encode a channel signal, an encoder side performs spatial parameter analysis on a plurality of channel signals to obtain reverberation gain parameters and other spatial parameters of the plurality of channel signals, and encodes the reverberation gain parameters and the other spatial parameters of the plurality of channel signals such that a decoder side can perform, based on the reverberation gain parameters of the channel signals during decoding, reverberation processing on the plurality of channel signals obtained through decoding to improve auditory effects. However, in some cases, for example, when a correlation between a plurality of channel signals is relatively low, worse auditory effects are caused when reverberation processing is performed, based on reverberation gain parameters corresponding to the plurality of channel signals, on the plurality of channel signals obtained through decoding.

SUMMARY

This application provides a multi-channel signal encoding method, a multi-channel signal decoding method, an encoder, and a decoder to improve quality of a channel signal.

According to a first aspect, a multi-channel signal encoding method is provided, where the method includes determining a downmixed signal of a first channel signal and a second channel signal in a multi-channel signal, an initial reverberation gain parameter of the first channel signal and the second channel signal, determining a target reverberation gain parameter of the first channel signal and the second channel signal based on a correlation between the first channel signal and the downmixed signal, a correlation between the second channel signal and the downmixed signal, and the initial reverberation gain parameter, and quantizing the first channel signal and the second channel signal based on the downmixed signal and the target reverberation gain parameter, and writing a quantized first channel signal and a quantized second channel signal into a bitstream.

In this application, when a target reverberation gain parameter of a channel signal is being determined, a correlation between the channel signal and the downmixed signal is considered. In this way, a better processing effect can be obtained when reverberation processing is performed on the channel signal based on the target reverberation gain parameter, thereby improving quality of a channel signal obtained after reverberation processing.

The correlation between the first channel signal or the second channel signal and the downmixed signal may be determined based on a difference between energy of the first channel signal or energy of the second channel signal and energy of the downmixed signal, or may be determined based on a difference between an amplitude of the first channel signal or an amplitude of the second channel signal and an amplitude of the downmixed signal.

With reference to the first aspect, in some implementations of the first aspect, the first channel signal, the second channel signal, and the downmixed signal are channel signals obtained after normalization processing.

With reference to the first aspect, in some implementations of the first aspect, the determining a target reverberation gain parameter of the first channel signal and the second channel signal based on a correlation between the first channel signal and the downmixed signal, a correlation between the second channel signal and the downmixed signal, and the initial reverberation gain parameter includes determining a target attenuation factor based on the correlation between the first channel signal and the downmixed signal and the correlation between the second channel signal and the downmixed signal, and adjusting the initial reverberation gain parameter based on the target attenuation factor to obtain the target reverberation gain parameter.

The initial reverberation gain parameter of the channel signal can be flexibly adjusted based on a value of the correlation between the channel signal and the downmixed signal using the attenuation factor.

The correlations between the first channel signal, the second channel signal, and the downmixed signal can be conveniently measured using the energy of the channel signal, that is, the target attenuation factor can be conveniently determined by comparing the difference between the energy of the channel signal and the energy of the downmixed signal. When the difference between the energy of the first channel signal or the energy of the second channel signal and the energy of the downmixed signal is relatively large (greater than a given threshold), it may be considered that the correlation between the first channel signal and the downmixed signal and the correlation between the second channel signal and the downmixed signal are relatively weak. In this case, a relatively large target attenuation factor may be determined. However, when the difference between the energy of the first channel signal or the energy of the second channel signal and the energy of the downmixed signal is relatively small (less than the given threshold), it may be considered that the correlation between the first channel signal and the downmixed signal and the correlation between the second channel signal and the downmixed signal are relatively strong. In this case, a relatively small target attenuation factor may be determined.

The determining a target attenuation factor based on the correlation between the first channel signal and the downmixed signal and the correlation between the second channel signal and the downmixed signal may be calculating the target attenuation factor based on the correlations between the channel signals and the downmixed signal, or may be directly determining a preset attenuation factor as the target attenuation factor after the correlations between the channel signals and the downmixed signal are considered.

With reference to the first aspect, in some implementations of the first aspect, each of the first channel signal and the second channel signal includes a plurality of frequency bins, and the determining a target attenuation factor based on the correlation between the first channel signal and the downmixed signal and the correlation between the second channel signal and the downmixed signal includes determining difference values between energy of the first channel signal and energy of the downmixed signal at the plurality of frequency bins and between energy of the second channel signal and energy of the downmixed signal at the plurality of frequency bins, and determining the target attenuation factor based on the difference values.

The difference between the energy of the first channel signal and the energy of the downmixed signal and the difference between the energy of the second channel signal and the energy of the downmixed signal can be conveniently determined by comparing the difference values between the energy of the first channel signal and the energy of the downmixed signal at the plurality of frequency bins and the energy of the second channel signal and the energy of the downmixed signal at the plurality of frequency bins, and the attenuation factor is further determined. Therefore, it is unnecessary to compare differences between energy of the first channel signal and energy of the downmixed signal and differences between energy of the second channel signal and energy of the downmixed signal in all frequency bands.

With reference to the first aspect, in some implementations of the first aspect, the determining difference values between energy of the first channel signal and energy of the downmixed signal at the plurality of frequency bins and between energy of the second channel signal and energy of the downmixed signal at the plurality of frequency bins includes determining a first difference value between the energy of the first channel signal and the energy of the downmixed signal, where the first difference value indicates a sum of absolute values of the difference values between the energy of the first channel signal and the energy of the downmixed signal at the plurality of frequency bins, and determining a second difference value between the energy of the second channel signal and the energy of the downmixed signal, where the second difference value indicates a sum of absolute values of the difference values between the energy of the second channel signal and the energy of the downmixed signal at the plurality of frequency bins, and the determining the target attenuation factor based on the difference values includes determining the target attenuation factor based on a ratio between the first difference value and the second difference value.

Alternatively, the target attenuation factor may be directly determined based on the first difference value and the second difference value.

With reference to the first aspect, in some implementations of the first aspect, before the determining the target attenuation factor based on the difference values, the method further includes determining that the difference values are greater than a preset threshold.

Only when the difference values between the energy of the first channel signal and the energy of the downmixed signal at the plurality of frequency bins and the energy of the second channel signal and the energy of the downmixed signal are relatively large, the target attenuation factor is determined, and the initial reverberation gain parameter is adjusted based on the target attenuation factor. When the difference values are relatively small, the initial reverberation gain parameter may not be adjusted, thereby improving encoding efficiency.

When difference values between energy of a plurality of channel signals and the energy of the downmixed signal are less than the preset threshold, initial reverberation gain parameter of the plurality of channel signals may be directly determined as target reverberation gain parameter of the plurality of channel signals.

With reference to the first aspect, in some implementations of the first aspect, the energy of the downmixed signal is determined based on the energy of the first channel signal and the energy of the second channel signal.

The energy of the downmixed signal can be calculated using the energy of the first channel signal and the energy of the second channel signal, and a calculation process can be simplified without using the downmixed signal itself.

With reference to the first aspect, in some implementations of the first aspect, the target attenuation factor includes a plurality of attenuation factors, each of the plurality of attenuation factors corresponds to at least one subband of the multi-channel signal, and any subband corresponds to only one attenuation factor.

When the target attenuation factor includes a plurality of attenuation factors, a reverberation gain parameter can be more flexibly adjusted based on the target attenuation factor.

With reference to the first aspect, in some implementations of the first aspect, each of frequency bands in which the first channel signal and the second channel signal are located includes a first frequency band and a second frequency band, an attenuation factor corresponding to a subband in the first frequency band is less than or equal to an attenuation factor corresponding to a subband in the second frequency band, and a frequency of the first frequency band is less than a frequency of the second frequency band.

Reverberation gain parameters corresponding to a high frequency subband and a low frequency subband can be adjusted to different degrees by setting attenuation factors of different sizes for the reverberation gain parameters corresponding to the high frequency subband and the low frequency subband, and a better processing effect can be obtained during reverberation processing.

According to a second aspect, a multi-channel signal encoding method is provided, where the method includes determining a downmixed signal of a first channel signal and a second channel signal in a multi-channel signal, an initial reverberation gain parameter of the first channel signal and the second channel signal, determining identification information of the first channel signal and the second channel signal based on a correlation between the first channel signal and the downmixed signal, and a correlation between the second channel signal and the downmixed signal, where the identification information indicates a channel signal that is in the first channel signal and the second channel signal and whose initial reverberation gain parameter needs to be adjusted, and quantizing the first channel signal and the second channel signal based on the downmixed signal, the initial reverberation gain parameter, and the identification information, and writing a quantized first channel signal and a quantized second channel signal into a bitstream.

The correlation between the first channel signal or the second channel signal and the downmixed signal may be determined based on a difference between energy of the first channel signal or energy of the second channel signal and energy of the downmixed signal, or may be determined based on a difference between an amplitude of the first channel signal or an amplitude of the second channel signal and an amplitude of the downmixed signal.

In this application, a channel signal whose initial reverberation gain parameter needs to be adjusted can be determined based on a correlation between the channel signal and the downmixed signal such that a decoder side can first adjust initial reverberation gain parameter of some channel signals and then perform reverberation processing on these channel signals, thereby improving quality of a channel signal obtained after reverberation processing.

With reference to the second aspect, in some implementations of the second aspect, the determining identification information of the first channel signal and the second channel signal based on a correlation between the first channel signal and the downmixed signal, and a correlation between the second channel signal and the downmixed signal includes determining the identification information of the first channel signal and the second channel signal based on a correlation between energy of the first channel signal and energy of the downmixed signal and a correlation between energy of the second channel signal and the energy of the downmixed signal.

The correlation between the first channel signal and the downmixed signal and the correlation between the second channel signal and the downmixed signal can be conveniently measured using the energy of the channel signals and the energy of the downmixed signal such that a channel signal whose initial reverberation gain parameter needs to be adjusted can be conveniently determined.

With reference to the second aspect, in some implementations of the second aspect, the determining the identification information of the first channel signal and the second channel signal based on a correlation between energy of the first channel signal and energy of the downmixed signal and a correlation between energy of the second channel signal and the energy of the downmixed signal includes determining a first difference value and a second difference value, where the first difference value is a sum of absolute values of difference values between energy of the first channel signal and energy of the downmixed signal at a plurality of frequency bins, and the second difference value is a sum of absolute values of difference values between energy of the second channel signal and energy of the downmixed signal at the plurality of frequency bins, and determining the identification information of the first channel signal and the second channel signal based on the first difference value and the second difference value.

It should be understood that energy values of the first channel signal, the second channel signal, and the downmixed signal may be values obtained after normalization processing.

The difference between the energy of the first channel signal and the energy of the downmixed signal and the difference between the energy of the second channel signal and the energy of the downmixed signal can be conveniently determined by comparing the difference values between the energy of the first channel signal and the energy of the downmixed signal at the plurality of frequency bins and the energy of the second channel signal and the energy of the downmixed signal at the plurality of frequency bins to determine a channel signal whose initial reverberation gain parameter needs to be adjusted. Therefore, it is unnecessary to compare differences between energy of the first channel signal and energy of the downmixed signal and differences between energy of the second channel signal and energy of the downmixed signal in all frequency bands.

With reference to the second aspect, in some implementations of the second aspect, the determining the identification information of the first channel signal and the second channel signal based on the first difference value and the second difference value includes determining the larger difference value in the first difference value and the second difference value as a target difference value, and determining the identification information based on the target difference value, where the identification information indicates a channel signal corresponding to the target difference value, and the channel signal corresponding to the target difference value is a channel signal whose initial reverberation gain parameter needs to be adjusted.

With reference to the second aspect, in some implementations of the second aspect, the method further includes determining a target attenuation factor based on the first difference value and the second difference value, where the target attenuation factor is used to adjust an initial reverberation gain parameter of a target channel signal, and quantizing the target attenuation factor, and writing a quantized target attenuation factor into the bitstream.

The initial reverberation gain parameter of the channel signal can be flexibly adjusted based on a value of the correlation between the channel signal and the downmixed signal using the attenuation factor.

With reference to the second aspect, in some implementations of the second aspect, the target attenuation factor includes a plurality of attenuation factors, each of the plurality of attenuation factors corresponds to at least one subband of the target channel signal, and any subband corresponds to only one attenuation factor.

When the target attenuation factor includes a plurality of attenuation factors, a reverberation gain parameter can be more flexibly adjusted based on the target attenuation factor.

With reference to the second aspect, in some implementations of the second aspect, the target channel signal includes a first frequency band and a second frequency band, an attenuation factor corresponding to a subband in the first frequency band is less than or equal to an attenuation factor corresponding to a subband in the second frequency band, and a frequency of the first frequency band is less than a frequency of the second frequency band.

Reverberation gain parameters corresponding to a high frequency subband and a low frequency subband can be adjusted to different degrees by setting attenuation factors of different sizes for the reverberation gain parameters corresponding to the high frequency subband and the low frequency subband, and a better processing effect can be obtained during reverberation processing.

With reference to the second aspect, in some implementations of the second aspect, the energy of the downmixed signal is determined based on the energy of the first channel signal and the energy of the second channel signal.

The energy of the downmixed signal is estimated or deduced using energy of a plurality of channel signals, which can reduce calculation.

According to a third aspect, a multi-channel signal decoding method is provided, where the method includes obtaining a bitstream, determining a downmixed signal of a first channel signal and a second channel signal in a multi-channel signal, an initial reverberation gain parameter of the first channel signal and the second channel signal, and identification information of the first channel signal and the second channel signal based on the bitstream, where the identification information indicates a channel signal that is in the first channel signal and the second channel signal and whose initial reverberation gain parameter needs to be adjusted, determining, as a target channel signal based on the identification information, the channel signal that is in the first channel signal and the second channel signal and whose initial reverberation gain parameter needs to be adjusted, and adjusting the initial reverberation gain parameter of the target channel signal.

In this application, the channel signal whose initial reverberation gain parameter needs to be adjusted can be determined using the identification information, and the initial reverberation gain parameter of the channel signal is adjusted before reverberation processing is performed on the channel signal, thereby improving quality of a channel signal obtained after reverberation processing.

With reference to the third aspect, in some implementations of the third aspect, the adjusting an initial reverberation gain parameter of the target channel signal includes determining a target attenuation factor, and adjusting the initial reverberation gain parameter of the target channel signal based on the target attenuation factor, to obtain a target reverberation gain parameter of the target channel signal.

The initial reverberation gain parameter of the channel signal can be flexibly adjusted based on a value of the correlation between the channel signal and the downmixed signal using the attenuation factor.

With reference to the third aspect, in some implementations of the third aspect, the determining a target attenuation factor includes determining a preset attenuation factor as the target attenuation factor.

A process of determining the target attenuation factor can be simplified by presetting the attenuation factor, thereby improving decoding efficiency.

With reference to the third aspect, in some implementations of the third aspect, the determining a target attenuation factor includes obtaining the target attenuation factor based on the bitstream.

When the bitstream includes the target attenuation factor, the target attenuation factor may be directly obtained from the bitstream, and the process of determining the target attenuation factor can be also simplified, thereby improving decoding efficiency.

With reference to the third aspect, in some implementations of the third aspect, the determining a target attenuation factor includes obtaining an inter-channel level difference between the first channel signal and the second channel signal from the bitstream, and determining the target attenuation factor based on the inter-channel level difference, or determining the target attenuation factor based on the inter-channel level difference and the downmixed signal.

The target attenuation factor can be more flexibly and accurately determined based on the inter-channel level difference, the downmixed signal, and the like such that an initial reverberation gain parameter of a channel signal can be more accurately adjusted based on the attenuation factor.

With reference to the third aspect, in some implementations of the third aspect, the target attenuation factor includes a plurality of attenuation factors, each of the plurality of attenuation factors corresponds to at least one subband of the target channel signal, and any subband corresponds to only one attenuation factor.

When the target attenuation factor includes a plurality of attenuation factors, a reverberation gain parameter can be more flexibly adjusted based on the target attenuation factor.

With reference to the third aspect, in some implementations of the third aspect, the target channel signal includes a first frequency band and a second frequency band, an attenuation factor corresponding to a subband in the first frequency band is less than or equal to an attenuation factor corresponding to a subband in the second frequency band, and a frequency of the first frequency band is less than a frequency of the second frequency band.

Reverberation gain parameters corresponding to a high frequency subband and a low frequency subband can be adjusted to different degrees by setting attenuation factors of different sizes for the reverberation gain parameters corresponding to the high frequency subband and the low frequency subband, and a better processing effect can be obtained during reverberation processing.

According to a fourth aspect, an encoder is provided, and the encoder includes a module or a unit configured to perform the method in the first aspect or various implementations of the first aspect.

According to a fifth aspect, an encoder is provided, and the encoder includes a module or a unit configured to perform the method in the second aspect or various implementations of the second aspect.

According to a sixth aspect, a decoder is provided, and the decoder includes a module or a unit configured to perform the method in the third aspect or various implementations of the third aspect.

According to a seventh aspect, an encoder is provided. The encoder includes a memory and a processor, where the memory is configured to store a program, the processor is configured to execute the program, and when the program is executed, the processor performs the method in the first aspect or various implementations of the first aspect.

According to an eighth aspect, an encoder is provided. The encoder includes a memory and a processor, where the memory is configured to store a program, the processor is configured to execute the program, and when the program is executed, the processor performs the method in the second aspect or various implementations of the second aspect.

According to a ninth aspect, a decoder is provided. The decoder includes a memory and a processor, where the memory is configured to store a program, the processor is configured to execute the program, and when the program is executed, the processor performs the method in the third aspect or various implementations of the third aspect.

According to a tenth aspect, a computer readable medium is provided, the computer readable medium stores program code to be executed by a device, and the program code includes an instruction used to perform the method in the first aspect or various implementations of the first aspect.

According to an eleventh aspect, a computer readable medium is provided, the computer readable medium stores program code to be executed by a device, and the program code includes an instruction used to perform the method in the second aspect or various implementations of the second aspect.

According to a twelfth aspect, a computer readable medium is provided, the computer readable medium stores program code to be executed by a device, and the program code includes an instruction used to perform the method in the third aspect or various implementations of the third aspect.

DESCRIPTION OF EMBODIMENTS

The following describes technical solutions of this application with reference to accompanying drawings. To better understand a multi-channel signal encoding method and a multi-channel signal decoding method in embodiments of this application, the following first briefly describes a multi-channel signal encoding method and a multi-channel signal decoding method with reference to FIG. 1 and FIG. 2.

Figure 1:
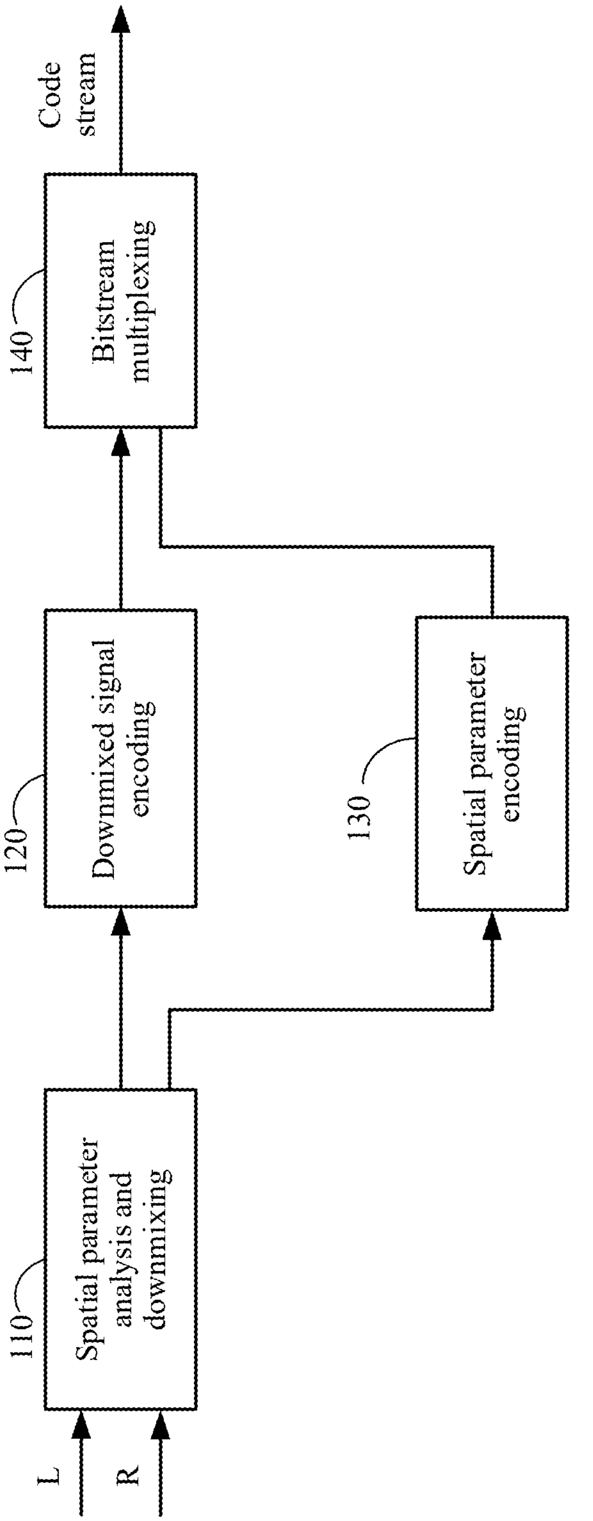
FIG. 1 is a schematic flowchart of encoding a left-channel signal and a right-channel signal.

FIG. 1 shows a process of encoding a left-channel signal and a right-channel signal. The encoding process shown in FIG. 1 specifically includes the following steps.

110. Perform spatial parameter analysis and downmixing processing on a left-channel signal (represented by L in the figure) and a right-channel signal (represented by R in the figure).

In an embodiment, step 110 includes performing spatial parameter analysis on the left-channel signal and the right-channel signal to obtain a spatial parameter of the left-channel signal and a spatial parameter of the right-channel signal, and performing downmixing processing on the left-channel signal and the right-channel signal to obtain a downmixed signal (where the downmixed signal obtained after downmixing processing is a mono audio signal, and the original two channels of audio signals are converted into one channel of audio signal through downmixing processing).

The spatial parameter (may be also referred to as a spatial sensing parameter) includes an inter-channel correlation (IC), an inter-channel level difference (ILD), an inter-channel time difference (ITD), an inter-channel phase difference (IPD), and the like.

The IC describes an inter-channel cross-correlation or coherence. This parameter determines sensing of a sound field range, and can improve spatial sense and sound stability of an audio signal. The ILD is used to distinguish a horizontal direction angle of a stereo source and describes an inter-channel intensity difference, and this parameter affects frequency components of an entire spectrum. The ITD and the IPD are spatial parameters representing horizontal directions of a sound source. They describe inter-channel time and phase differences. The parameters mainly affect frequency components below 2 kHz. For two channel signals, the ITD may represent a time delay between a left-channel signal and a right-channel signal of a stereo, and the IPD may represent a waveform similarity of the left-channel signal and the right-channel signal of the stereo after time alignment. The ILD, the ITD, and the IPD can determine human ears' sensing of a location of a sound source, effectively determine a sound field location, and play an important role in stereo signal restoration.

120. Encode the downmixed signal to obtain a bitstream.

130. Encode the spatial parameters to obtain a bitstream.

140. Multiplex the bitstream obtained by encoding the downmixed signal and the bitstream obtained by encoding the spatial parameters to obtain a bitstream.

The bitstream obtained through encoding may be stored or transmitted to a decoder-side device.

Figure 2:
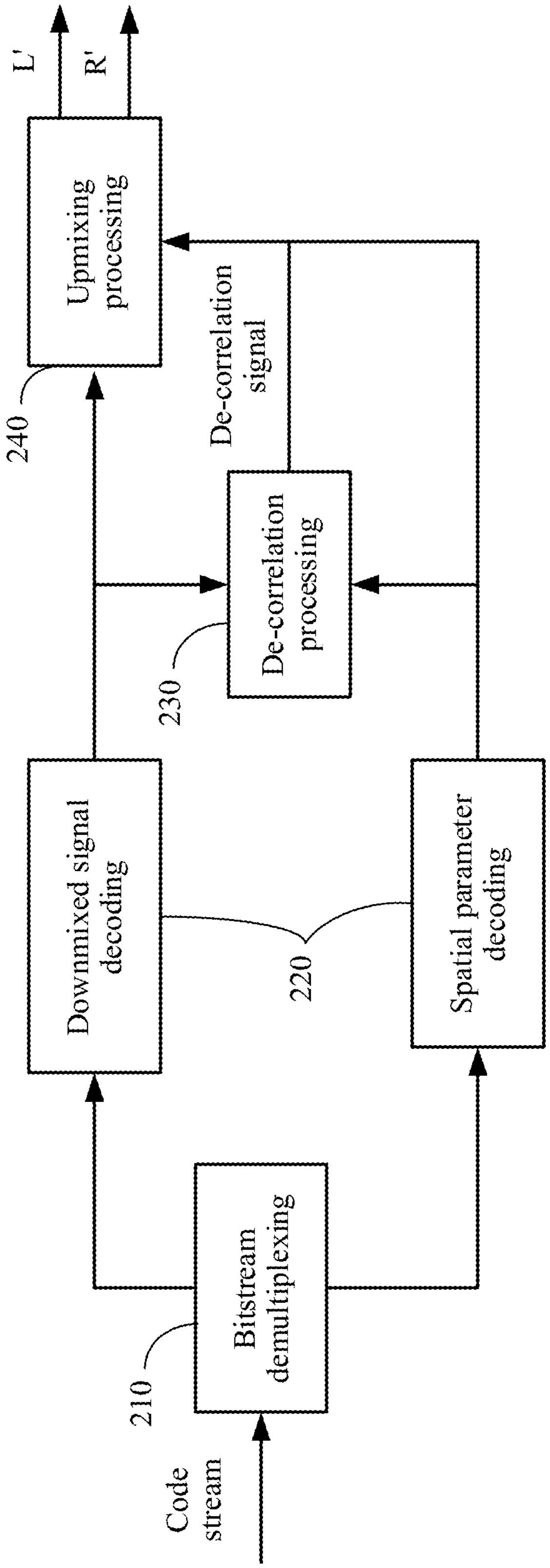
FIG. 2 is a schematic flowchart of decoding a left-channel signal and a right-channel signal.

FIG. 2 shows a process of decoding a left-channel signal and a right-channel signal. The decoding process shown in FIG. 2 includes the following steps.

210. Demultiplex a bitstream to separately obtain a bitstream obtained by encoding a downmixed signal and a bitstream obtained by encoding a spatial parameter.

220. Decode the bitstreams to obtain a downmixed signal of a left-channel signal and a right-channel signal, a spatial parameter of the left-channel signal, and a spatial parameter of the right-channel signal.

The spatial parameters include an IC of the left-channel signal and the right-channel signal.

230. Obtain a de-correlation signal based on a downmixed signal and a spatial parameter of a current frame.

The left-channel signal and the right-channel signal are obtained based on a decoded downmixed signal and the de-correlation signal of the current frame.

240. Obtain finally output left-channel signal and right-channel signal (respectively represented by L' and R' in FIG. 2) based on the spatial parameters, the left-channel signal, and the right-channel signal.

It should be understood that the left-channel signal and the right-channel signal (respectively represented by L' and R' in FIG. 2) in step 240 are obtained through decoding, and may be distorted to some extent compared with a left-channel signal and a right-channel signal that are encoded on an encoder side.

In an embodiment, the downmixed signal may be filtered, and then an inter-channel correlation parameter is used to correct a filtered downmixed signal to obtain a de-correlation signal.

A purpose of generating the de-correlation signal is to improve a sense of reverberation of a finally generated stereo signal on a decoder side, and increase a sound field width of the stereo signal such that an output audio signal is more mellow and full in terms of auditory sense. The sense of reverberation is essentially an effect of delaying such as reflecting and refracting an original audio signal differently and then superimposing the reflected and refracted audio signals on the original audio signal to enter a human ear.

After the IC is obtained, a correlation of different channel signals is not considered so as to adaptively adjust the IC. In this case, when reverberation processing is performed on the channel signal based on the previously obtained IC, a relatively poor auditory effect may be caused. For example, when a correlation between different channel signals is relatively low, if the previously obtained IC is still used to correct a de-correlation signal, and then the de-correlation signal is used to perform same reverberation processing on the different channel signals, quality of a channel signal finally output by the decoder side is relatively poor. That is, because a difference between different channel signals is relatively large, if reverberation processing is performed on different channel signals by still using the de-correlation signal corrected by the previous relatively large IC, a reverberation effect of the channel signal is not increased, but the output channel signal may be distorted.

Therefore, the embodiments of this application provide a multi-channel signal encoding or decoding method. In this method, a reverberation gain parameter can be correspondingly adjusted based on a correlation between different channel signals, and a de-correlation signal is corrected using an adjusted reverberation gain parameter. Then, reverberation processing is performed on different channel signals using the de-correlation signal. In this way, when reverberation processing is performed on different channel signals, the correlation between different channel signals is considered such that quality of an output channel signal is better.

Figure 3:
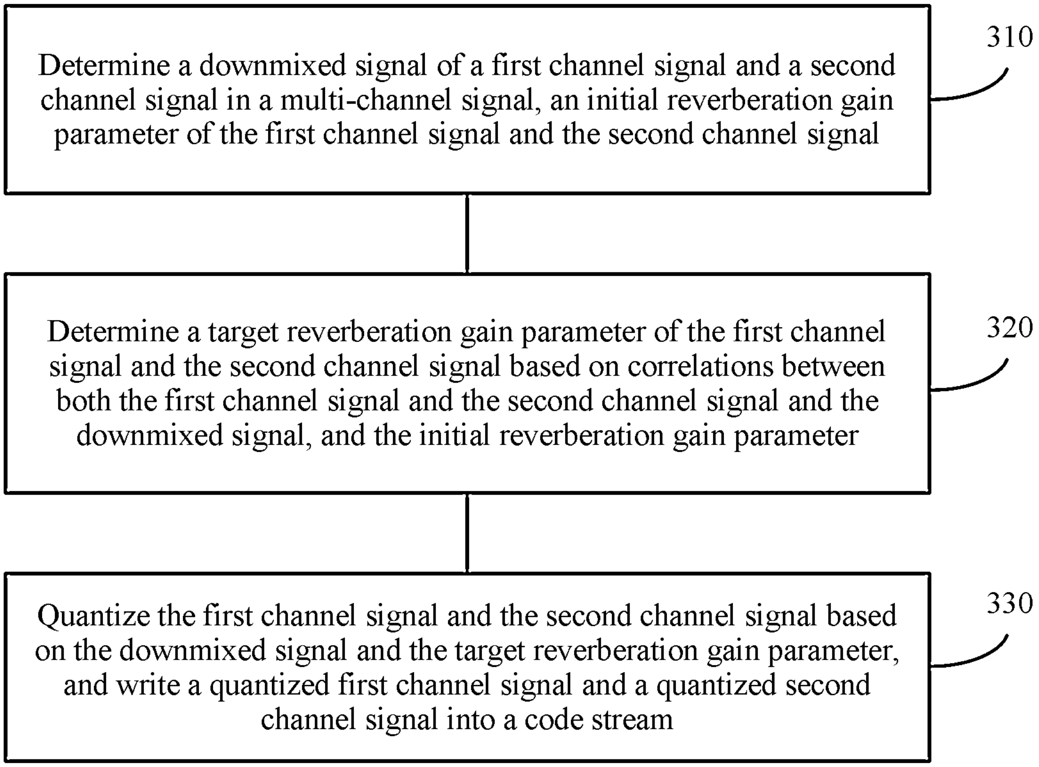
FIG. 3 is a schematic flowchart of a multi-channel signal encoding method according to an embodiment of this application.

FIG. 3 is a schematic flowchart of a multi-channel signal encoding method according to an embodiment of this application. The method in FIG. 3 may be performed by an encoder-side device or an encoder. The method in FIG. 3 includes the following steps.

310. Determine a downmixed signal of a first channel signal and a second channel signal in a multi-channel signal, an initial reverberation gain parameter of the first channel signal and the second channel signal.

It should be understood that, in this embodiment of this application, a sequence of determining the downmixed signal and determining the initial reverberation gain parameter is not limited, and the downmixed signal and the initial reverberation gain parameter may be determined simultaneously or successively.

The initial reverberation gain parameter may be reverberation gain parameter obtained after spatial parameter analysis is performed on the first channel signal and the second channel signal.

In an embodiment, the downmixed signal may be obtained by performing downmixing processing on the plurality of channel signals. A spatial parameter of the first channel signal and a spatial parameter of the second channel signal are obtained by performing spatial parameter analysis on the first channel signal and the second channel signal, where the spatial parameters include the initial reverberation gain parameter of the first channel signal and the second channel signal.

It should be understood that the first channel signal and the second channel signal may correspond to a same spatial parameter, and correspondingly, the first channel signal and the second channel signal may also correspond to a same initial reverberation gain parameter. That is, the spatial parameter of the first channel signal and the spatial parameter of the second channel signal may be the same, and the initial reverberation gain parameter of the first channel signal and the second channel signal may also be the same.

Further, assuming that each of the first channel signal and the second channel signal includes 10 subbands, and each subband corresponds to one reverberation gain parameter, reverberation gain parameters corresponding to subbands, whose index values are the same, of the first channel signal and the second channel signal may be the same.

In addition, the first channel signal, the second channel signal, and the downmixed signal may be channel signals obtained after normalization processing.

320. Determine a target reverberation gain parameter of the first channel signal and the second channel signal based on a correlation between the first channel signal and the downmixed signal, a correlation between the second channel signal and the downmixed signal, and the initial reverberation gain parameter.

Optionally, the correlation between the first channel signal or the second channel signal and the downmixed signal may be determined based on a difference between energy of the first channel signal or energy of the second channel signal and energy of the downmixed signal, or may be determined based on a difference between an amplitude of the first channel signal or an amplitude of the second channel signal and an amplitude of the downmixed signal.

In an embodiment, when the difference between the energy or the amplitude of the first channel signal and the energy or the amplitude of the downmixed signal is relatively small, it may be considered that the correlation between the first channel signal and the downmixed signal is relative large. When the difference between the energy or the amplitude of the first channel signal and the energy or the amplitude of the downmixed signal is relatively large, it may be considered that the correlation between the first channel signal and the downmixed signal is relatively small.

The difference between the energy of the first channel signal or the energy of the second channel signal and the energy of the downmixed signal may be a difference value between the energy of the first channel signal or the energy of the second channel signal and the energy of the downmixed signal. Similarly, the difference between the amplitude of the first channel signal or the amplitude of the second channel signal and the amplitude of the downmixed signal may be a difference value between the amplitude of the first channel signal or the amplitude of the second channel signal and the amplitude of the downmixed signal.

In addition, the correlation between the first channel signal or the second channel signal and the downmixed signal may alternatively refer to a difference between a phase, a period, or the like of the first channel signal or the second channel signal and a phase, a period, or the like of the downmixed signal.

330. Quantize the first channel signal and the second channel signal based on the downmixed signal and the target reverberation gain parameter, and write a quantized first channel signal and a quantized second channel signal into a bitstream.

It should be understood that when the multi-channel signal has more than two channel signals, for example, when the multi-channel signal includes the first channel signal, the second channel signal, a third channel signal, and a fourth channel signal, the first channel signal and the second channel signal may be processed using the method in FIG. 3, and the third channel signal and the fourth channel signal are also processed using the method in FIG. 3.

In this application, when a target reverberation gain parameter of a channel signal is being determined, a correlation between the channel signal and the downmixed signal is considered. In this way, a better processing effect can be obtained when reverberation processing is performed on the channel signal based on the target reverberation gain parameter, thereby improving quality of a channel signal obtained after reverberation processing.

Optionally, in an embodiment, the determining a target reverberation gain parameter of the first channel signal and the second channel signal based on a correlation between the first channel signal and the downmixed signal, a correlation between the second channel signal and the downmixed signal, and the initial reverberation gain parameter includes determining a target attenuation factor based on the correlation between the first channel signal and the downmixed signal and the correlation between the second channel signal and the downmixed signal, and adjusting the initial reverberation gain parameter based on the target attenuation factor, to obtain the target reverberation gain parameter.

In an embodiment, the determining a target attenuation factor based on the correlation between the first channel signal and the downmixed signal and the correlation between the second channel signal and the downmixed signal may be calculating the target attenuation factor based on the correlations between the channel signals and the downmixed signal, or may be directly determining a preset attenuation factor as the target attenuation factor after the correlations between the channel signals and the downmixed signal are considered.

The initial reverberation gain parameter of the channel signal can be flexibly adjusted based on a value of the correlation between the channel signal and the downmixed signal using the attenuation factor.

For example, when the correlation between the first channel signal and the downmixed signal and the correlation between the second channel signal and the downmixed signal are relatively large (in this case, it may also be considered that the first channel signal is relatively similar to the second channel signal), a target attenuation factor with a relatively small value may be determined. However, when the correlation between the first channel signal and the downmixed signal and the correlation between the second channel signal and the downmixed signal are relatively small (in this case, it may also be considered that the first channel signal is relatively different from the second channel signal), a target attenuation factor with a relatively large value may be determined.

In some embodiments, correlations between the plurality of channel signals and the downmixed signal may refer to differences between energy of the plurality of channel signals and the energy of the downmixed signal, or differences between amplitudes of the plurality of channel signals and the amplitude of the downmixed signal. The differences between the energy of the plurality of channel signals and the energy of the downmixed signal may be difference values between the energy of the plurality of channel signals and the energy of the downmixed signal. Similarly, the differences between the amplitudes of the plurality of channel signals and the amplitude of the downmixed signal may be difference values between the amplitudes of the plurality of channel signals and the amplitude of the downmixed signal. In addition, the correlations between the plurality of channel signals and the downmixed signal may alternatively refer to differences between phases, periods, or the like of the plurality of channel signals and the phase, the period, or the like of the downmixed signal.

In some embodiments, the correlation between the first channel signal or the second channel signal and the downmixed signal may be determined based on the difference between the energy of the first channel signal or the energy of the second channel signal and the energy of the downmixed signal, and further the target attenuation factor is determined.

The correlation between the first channel signal and the downmixed signal and the correlation between the second channel signal and the downmixed signal can be conveniently measured using the energy of the channel signals and the energy of the downmixed signal, that is, the target attenuation factor can be conveniently determined by comparing the difference between the energy of the first channel signal or the energy of the second channel signal and the energy of the downmixed signal.

Optionally, in an embodiment, both the first channel signal and the second channel signal include a plurality of frequency bins, and the determining a target attenuation factor based on the correlation between the first channel signal and the downmixed signal and the correlation between the second channel signal and the downmixed signal includes determining difference values between energy of the first channel signal and energy of the downmixed signal at the plurality of frequency bins and between energy of the second channel signal and energy of the downmixed signal at the plurality of frequency bins, and determining the target attenuation factor based on the difference values.

The difference values between the energy of the first channel signal and the energy of the downmixed signal at the plurality of frequency bins may be difference values between energy of the first channel signal and energy of the downmixed signal at a plurality of same frequency bins. For example, the first channel signal includes three frequency bins (a first frequency channel number, a second frequency channel number, and a third frequency channel number). In this case, difference values between energy of the first channel signal and energy of the downmixed signal at the three frequency bins are a difference value between the first channel signal and the downmixed signal at the first frequency channel number, a difference value between the first channel signal and the downmixed signal at the second frequency channel number, and a difference value between the first channel signal and the downmixed signal at the third frequency channel number.

Similarly, the difference values between the energy of the second channel signal and the energy of the downmixed signal at the plurality of frequency bins may be difference values between energy of the second channel signal and energy of the downmixed signal at a plurality of same frequency bins.

Optionally, the difference values between the energy of the first channel signal and the energy of the downmixed signal at the plurality of frequency bins may be a sum of absolute values of the difference values between the energy of the first channel signal and the energy of the downmixed signal at the plurality of frequency bins. Similarly, the difference values between the energy of the second channel signal and the energy of the downmixed signal at the plurality of frequency bins may be a sum of absolute values of the difference values between the energy of the second channel signal and the energy of the downmixed signal at the plurality of frequency bins.

It should be understood that energy values of the first channel signal, the second channel signal, and the downmixed signal may be values obtained after normalization processing.

The difference between the energy of the first channel signal and the energy of the downmixed signal and the difference between the energy of the second channel signal and the energy of the downmixed signal can be conveniently determined by comparing the difference values between the energy of the first channel signal and the energy of the downmixed signal at the plurality of frequency bins and the energy of the second channel signal and the energy of the downmixed signal at the plurality of frequency bins, and the attenuation factor is further determined. Therefore, it is unnecessary to compare differences between energy of the first channel signal and energy of the downmixed signal and differences between energy of the second channel signal and energy of the downmixed signal in all frequency bands.

Optionally, in an embodiment, the determining difference values between energy of the first channel signal and energy of the downmixed signal at the plurality of frequency bins and between energy of the second channel signal and energy of the downmixed signal at the plurality of frequency bins includes determining a first difference value between the energy of the first channel signal and the energy of the downmixed signal, where the first difference value indicates a sum of absolute values of the difference values between the energy of the first channel signal and the energy of the downmixed signal at the plurality of frequency bins, determining a second difference value between the energy of the second channel signal and the energy of the downmixed signal, where the second difference value indicates a sum of absolute values of the difference values between the energy of the second channel signal and the energy of the downmixed signal at the plurality of frequency bins, and determining the target attenuation factor based on the first difference value and the second difference value.

The determining the target attenuation factor based on the first difference value and the second difference value may include determining the target attenuation factor based on a ratio between the first difference value and the second difference value.

In an embodiment, when the first channel signal is a left-channel signal and the second channel signal is a right-channel signal, the first difference value and the second difference value may be calculated according to the following formula:

$$\text{diff\_l\_h} = \sum_{k=M1}^{M2} |\text{mag\_l}[k] - \text{mag\_dmx}[k]| \quad (1)$$

$$\text{diff\_r\_h} = \sum_{k=M1}^{M2} |\text{mag\_r}[k] - \text{mag\_dmx}[k]| \quad (2)$$

where diff_l_h is the first difference value, diff_r_h is the second difference value, a frequency band of each of the left-channel signal and the right-channel signal includes a high frequency part and a low frequency part, M1 is a start frequency channel number of the high frequency part, M2 is an end frequency channel number of the high frequency part, mag_l[k] is energy or an amplitude value of the left-channel signal at a frequency channel number between M1 and M2, mag_r[k] is energy or an amplitude value of the right-channel signal at a frequency channel number with an index k between M1 and M2, mag_dmx [k] is energy or an amplitude value of the downmixed signal at the frequency channel number with an index k between M1 and M2, and mag_dmx[k] may be obtained through calculation using the downmixed signal itself, or may be obtained through calculation based on the energy or the amplitude values of the left-channel signal and the right-channel signal.

When the target attenuation factor is being determined based on the first difference value and the second difference value, the ratio between the first difference value and the second difference value may be directly determined as the target attenuation factor. For example, the first difference value is a, and the second difference value is b. When a<b, a/b is determined as the target attenuation factor, or when a>b, b/a is determined as the target attenuation factor. In addition, after the target attenuation factor is determined based on the first difference value and the second difference value, some smoothing processing may be performed on the target attenuation factor and an attenuation factor of a previous frame, and a target attenuation factor obtained after smoothing processing is used to further adjust the initial reverberation gain parameter of the plurality of channel signals.

Optionally, in an embodiment, before the target attenuation factor is determined based on the foregoing difference values, the method in FIG. 3 further includes determining that the difference values are greater than a preset threshold.

It should be understood that, that the difference values are greater than the preset threshold herein may mean that the difference values between the energy of the first channel signal and the energy of the downmixed signal at the plurality of frequency bins and the energy of the second channel signal and the energy of the downmixed signal are greater than a same preset threshold, or may mean that the difference between the energy of the first channel signal and the energy of the downmixed signal is greater than a preset first threshold, and the difference between the energy of the second channel signal and the energy of the downmixed signal is greater than a preset second threshold.

Only when the difference values between the energy of the first channel signal and the energy of the downmixed signal at the plurality of frequency bins and the energy of the second channel signal and the energy of the downmixed signal are relatively large, the target attenuation factor is determined, and the initial reverberation gain parameter is adjusted based on the target attenuation factor. When the difference values are relatively small, the initial reverberation gain parameter may not be adjusted, thereby improving encoding efficiency.

For example, when the difference value between the energy of the first channel signal and the energy of the downmixed signal is greater than M (where M is between 0.5 and 1) times the energy of the first channel signal, it may be considered that the difference value between the energy of the first channel signal and the energy of the downmixed signal is greater than the preset threshold. In this case, the preset threshold is M times the energy of the first channel signal. Alternatively, when a ratio of the difference value between the energy of the first channel signal and the energy of the downmixed signal to the energy of the first channel signal is greater than M, it may also be considered that the difference value between the energy of the first channel signal and the energy of the downmixed signal is greater than the preset threshold.

When difference values between energy of a plurality of channel signals and the energy of the downmixed signal are less than the preset threshold, initial reverberation gain parameter of the plurality of channel signals may be directly determined as target reverberation gain parameter of the plurality of channel signals.

Optionally, in an embodiment, the energy of the downmixed signal is determined based on the energy of the first channel signal and the energy of the second channel signal.

The energy of the downmixed signal can be calculated using the energy of the first channel signal and the energy of the second channel signal, and a calculation process can be simplified without using the downmixed signal itself.

Certainly, in this embodiment of this application, the energy of the downmixed signal may alternatively be directly calculated based on the downmixed signal itself.

Optionally, in an embodiment, the target attenuation factor includes a plurality of attenuation factors, each of the plurality of attenuation factors corresponds to at least one subband of the multi-channel signal, and any subband corresponds to only one attenuation factor.

For example, indexes of subbands included in each of the first channel signal and the second channel signal are 0 to 9. Both the first channel signal and the second channel signal include 10 reverberation gain parameters, each subband corresponds to one reverberation gain parameter, the target attenuation factor includes five attenuation factors, and each attenuation factor corresponds to two subbands, or the target attenuation factor includes 10 attenuation factors, and each attenuation factor corresponds to one subband.

In addition, when the target attenuation factor includes a plurality of attenuation factors, a reverberation gain parameter can be more flexibly adjusted based on the target attenuation factor. For example, reverberation gain parameters corresponding to subbands, whose indexes are 0 to 4, of a plurality of channel signals need to be adjusted slightly, but reverberation gain parameters corresponding to subbands, whose indexes are 5 to 9, of a channel signal need to be adjusted greatly. In this case, relatively small attenuation factors may be set for the reverberation gain parameters corresponding to the subbands whose indexes are 0 to 4, and relatively large attenuation factors are set for the reverberation gain parameters corresponding to the subbands whose indexes are 5 to 9.

Optionally, in an embodiment, each of the first channel signal and the second channel signal (where a frequency band occupied by the first channel signal and a frequency band occupied by the second channel signal are the same) includes a first frequency band and a second frequency band, an attenuation factor corresponding to a subband in the first frequency band is less than or equal to an attenuation factor corresponding to a subband in the second frequency band, and a frequency of the first frequency band is less than a frequency of the second frequency band.

For example, each of frequency bands in which the first channel signal and the second channel signal are located includes a low frequency part and a high frequency part, and the target attenuation factor includes a plurality of attenuation factors. The low frequency part corresponds to at least one attenuation factor, the high frequency part corresponds to at least one attenuation factor, and the attenuation factor corresponding to the low frequency part is less than the attenuation factor corresponding to the high frequency part.

Reverberation gain parameters corresponding to a high frequency subband and a low frequency subband can be adjusted to different degrees by setting attenuation factors of different sizes for the reverberation gain parameters corresponding to the high frequency subband and the low frequency subband, and a better processing effect can be obtained during reverberation processing.

Figure 4:
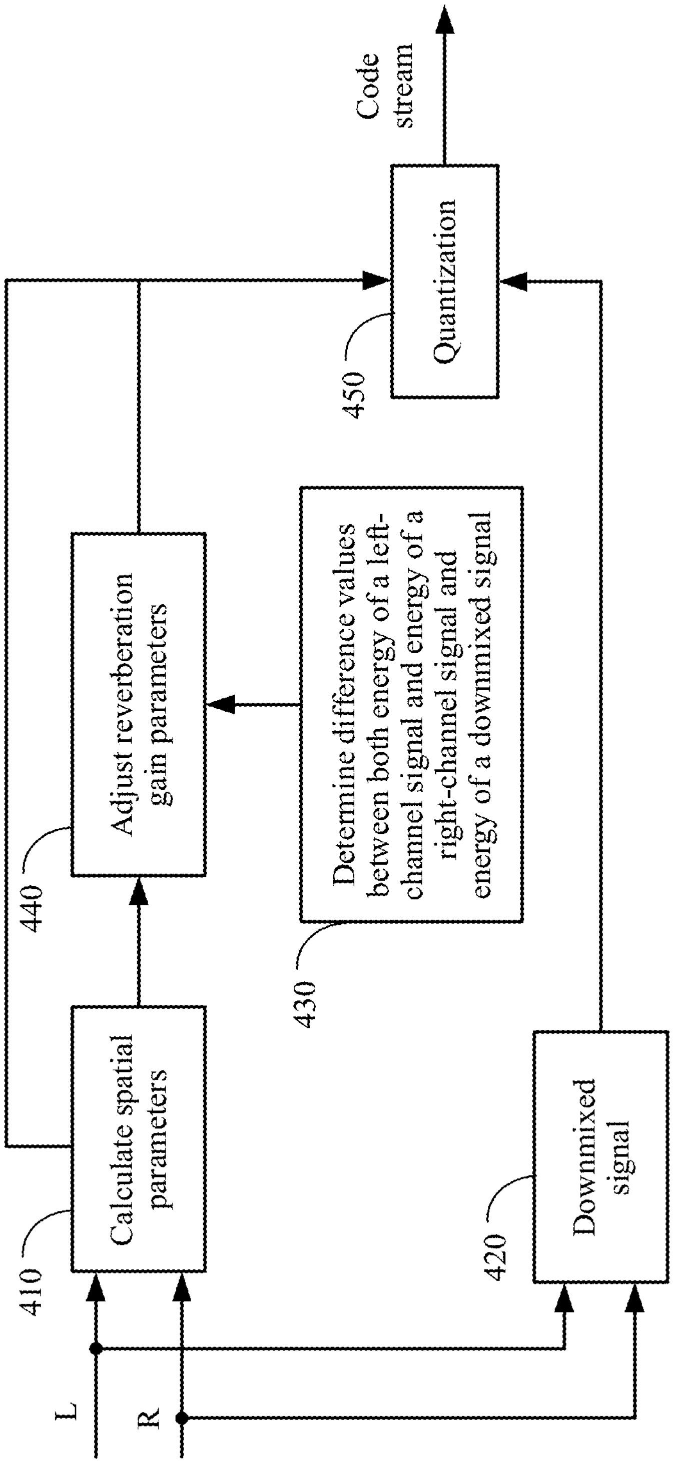
FIG. 4 is a schematic flowchart of a multi-channel signal encoding method according to an embodiment of this application.

FIG. 4 is a schematic flowchart of a multi-channel signal encoding method according to an embodiment of this application. In FIG. 4, channel signals include a left-channel signal and a right-channel signal, and a process of encoding the left-channel signal and the right-channel signal includes the following steps.

410. Calculate a spatial parameter of the left-channel signal and a spatial parameter of the right-channel signal.

The spatial parameters include initial reverberation gain parameter of the left-channel signal and the right-channel signal, and another spatial parameter.

420. Perform downmixing processing on the left-channel signal (represented by L in the figure) and the right-channel signal (represented by R in the figure) to obtain a downmixed signal.

430. Determine difference values between energy of the left-channel signal and energy of the downmixed signal and between energy of the right-channel signal and energy of the downmixed signal.

In an embodiment, each of the left-channel signal and the right-channel signal may be divided into a high frequency part and a low frequency part, and difference values between energy of the left-channel signal and energy of the downmixed signal and between energy of the right-channel signal and energy of the downmixed signal at the high frequency part are determined as the difference values between the energy of the left-channel signal and the energy of the downmixed signal and between the energy of the right-channel signal and the energy of the downmixed signal.

440. Adjust reverberation gain parameters of the left-channel signal and the right-channel signal based on the difference values between the energy of the left-channel signal and the energy of the downmixed signal and between the energy of the right-channel signal and the energy of the downmixed signal.

In an embodiment, an encoder side may determine a target attenuation factor based on the difference values between the energy of the left-channel signal and the energy of the downmixed signal and between the energy of the right-channel signal and the energy of the downmixed signal, and adjust the reverberation gain parameters of the left-channel signal and the right-channel signal based on the target attenuation factor.

450. Quantize the downmixed signal, adjusted reverberation gain parameters, and another spatial parameter to obtain a bitstream.

Figure 5:
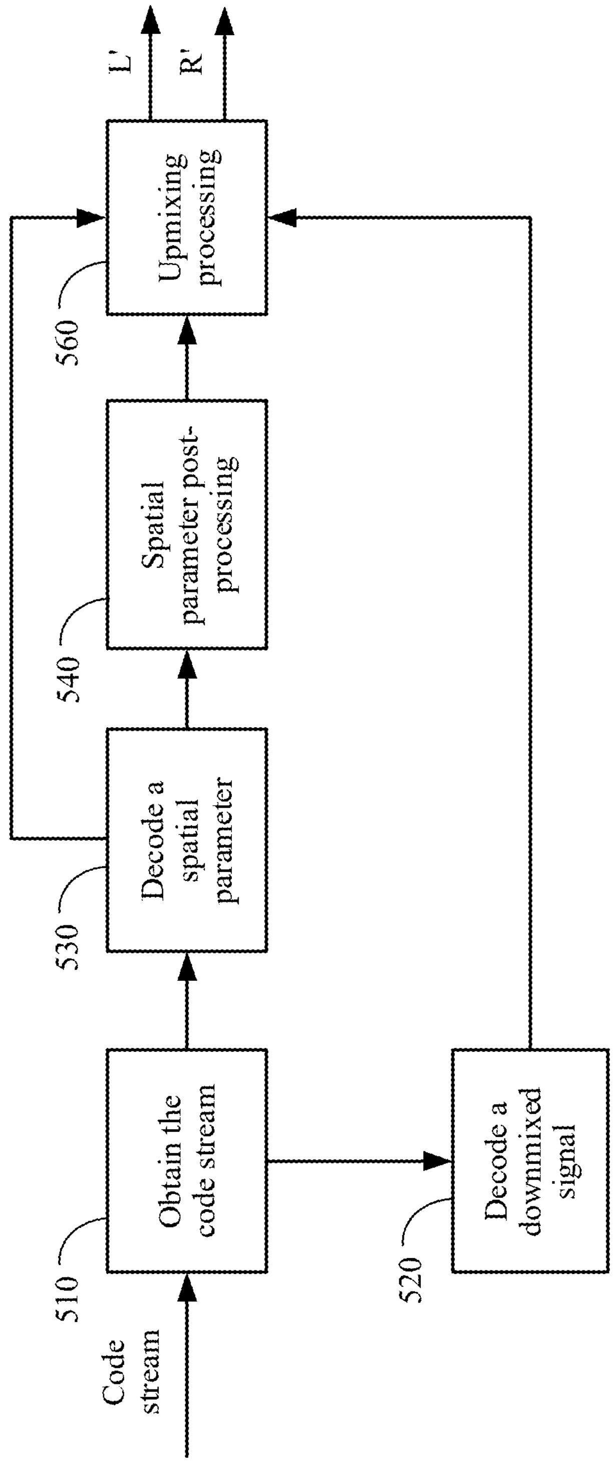
FIG. 5 is a schematic flowchart of a multi-channel signal decoding method according to an embodiment of this application.

FIG. 5 is a schematic flowchart of a multi-channel signal decoding method according to an embodiment of this application. In FIG. 5, channel signals include a left-channel signal and a right-channel signal. In FIG. 5, the bitstream generated through encoding in the encoding method in FIG. 4 may be decoded. A decoding process in FIG. 5 includes the following steps.

510. Obtain a bitstream of the left-channel signal and the right-channel signal.

520. Decode the bitstream to obtain a downmixed signal.

530. Decode the bitstream to obtain spatial parameters of the left-channel signal and the right-channel signal.

The spatial parameter includes a reverberation gain parameter adjusted by an encoder side, that is, the encoder side encodes the adjusted reverberation gain parameter. In this way, after decoding the bitstream, a decoder side obtains the reverberation gain parameter adjusted by the encoder side.

Step 520 and step 530 are not performed in a sequence, and may be performed simultaneously.

540. Perform subsequent processing (for example, smoothing filtering) on the spatial parameters obtained through decoding.

A de-correlation signal is obtained based on the downmixed signal and the reverberation gain parameter that are obtained through decoding (where the reverberation gain parameter is the reverberation gain parameter adjusted by the encoder side).

560. Perform upmixing processing based on the spatial parameters and the downmixed signal processed in step 540 to obtain the left-channel signal and the right-channel signal.

Reverberation processing is separately performed on the left-channel signal and the right-channel signal based on the de-correlation signal.

In the method shown in FIG. 5, the reverberation gain parameter based on which reverberation processing is performed on the left-channel signal and the right-channel signal has been adjusted based on correlations between the left-channel signal and the downmixed signal and between the right-channel signal and the downmixed signal. In this way, corresponding reverberation processing can be performed based on a difference between the left-channel signal and the right-channel signal, thereby improving quality of a channel signal obtained after reverberation processing.

In the encoding method in FIG. 3, the encoder side determines whether an initial reverberation gain parameter of a channel signal needs to be adjusted. If the initial reverberation gain parameter of the channel signal needs to be adjusted, the encoder side adjusts the initial reverberation gain parameter of the channel signal, and encodes an adjusted reverberation gain parameter such that the decoder side directly performs reverberation processing based on a reverberation gain parameter obtained through decoding.

Actually, the encoder side may alternatively determine only whether the initial reverberation gain parameter of the channel signal needs to be adjusted. If the initial reverberation gain parameter of the channel signal needs to be adjusted, the encoder side sends corresponding indication information to the decoder side. After receiving the indication information, the decoder side adjusts the initial reverberation gain parameter of the channel signal.

Figure 6:
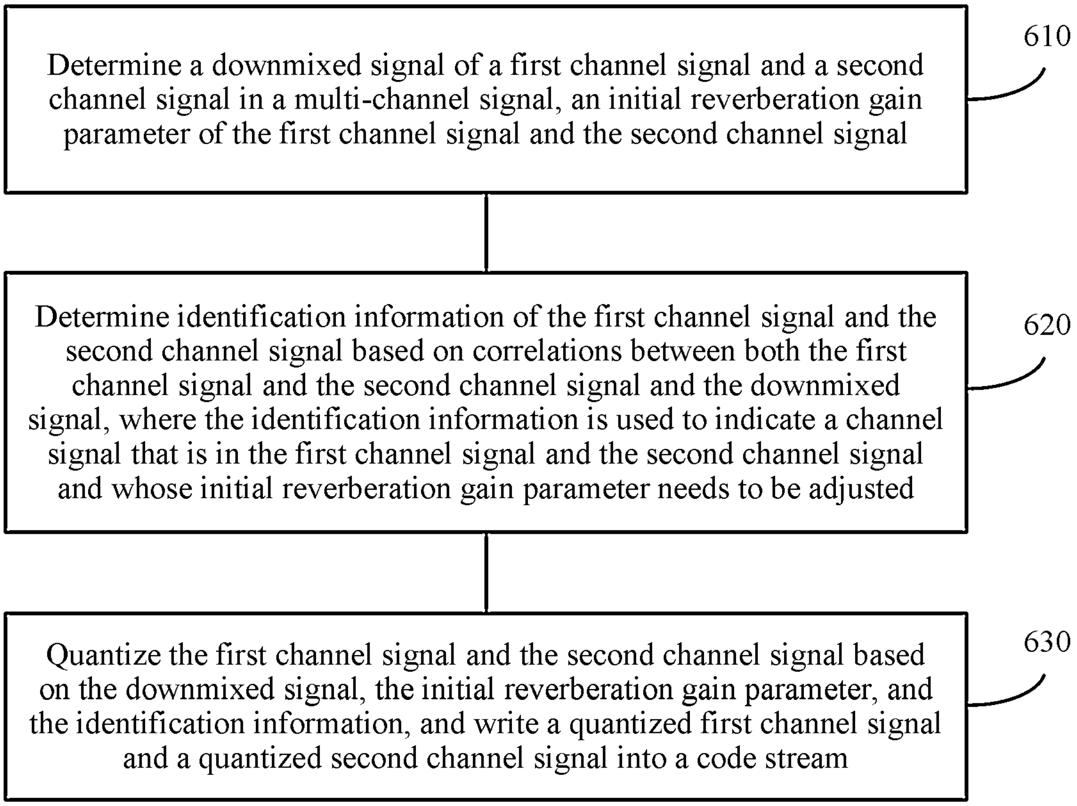
FIG. 6 is a schematic flowchart of a multi-channel signal encoding method according to an embodiment of this application.

FIG. 6 is a schematic flowchart of a multi-channel signal encoding method according to an embodiment of this application. The method in FIG. 6 includes the following steps.

610. Determine a downmixed signal of a first channel signal and a second channel signal in a multi-channel signal, an initial reverberation gain parameter of the first channel signal and the second channel signal.

In an embodiment, the downmixed signal may be obtained by performing downmixing processing on the first channel signal and the second channel signal, and spatial parameters are obtained by performing spatial parameter analysis on the first channel signal and the second channel signal, where the spatial parameters include the initial reverberation gain parameter of the first channel signal and the second channel signal.

It should be understood that the downmixed signal and the initial reverberation gain parameter may be determined simultaneously or successively.

It should be understood that the first channel signal and the second channel signal may correspond to a same spatial parameter, and, the first channel signal and the second channel signal also correspond to a same initial reverberation gain parameter. That is, a spatial parameter of the first channel signal and a spatial parameter of the second channel signal are the same, and the initial reverberation gain parameter of the first channel signal and the second channel signal are the same.

Further, assuming that each of the first channel signal and the second channel signal includes 10 subbands, and each subband corresponds to one reverberation gain parameter, reverberation gain parameters corresponding to subbands, whose index values are the same, of the first channel signal and the second channel signal may be the same.

620. Determine identification information of the first channel signal and the second channel signal based on a correlation between the first channel signal and the downmixed signal, and a correlation between the second channel signal and the downmixed signal, where the identification information indicates a channel signal that is in the first channel signal and the second channel signal and whose initial reverberation gain parameter needs to be adjusted.

Optionally, the correlation between the first channel signal or the second channel signal and the downmixed signal may be determined based on a difference between energy of the first channel signal or energy of the second channel signal and energy of the downmixed signal, or may be determined based on a difference between an amplitude of the first channel signal or an amplitude of the second channel signal and an amplitude of the downmixed signal.

In an embodiment, when the difference between the energy or the amplitude of the first channel signal and the energy or the amplitude of the downmixed signal is relatively small, it may be considered that the correlation between the first channel signal and the downmixed signal is relative large. When the difference between the energy or the amplitude of the first channel signal and the energy or the amplitude of the downmixed signal is relatively large, it may be considered that the correlation between the first channel signal and the downmixed signal is relatively small.

The difference between the energy of the first channel signal or the energy of the second channel signal and the energy of the downmixed signal may be a difference value between the energy of the first channel signal or the energy of the second channel signal and the energy of the downmixed signal. Similarly, the difference between the amplitude of the first channel signal or the amplitude of the second channel signal and the amplitude of the downmixed signal may be a difference value between the amplitude of the first channel signal or the amplitude of the second channel signal and the amplitude of the downmixed signal.

In addition, the correlation between the first channel signal or the second channel signal and the downmixed signal may alternatively refer to a difference between a phase, a period, or the like of the first channel signal or the second channel signal and a phase, a period, or the like of the downmixed signal.

The first channel signal, the second channel signal, and the downmixed signal may be channel signals obtained after normalization processing.

In an embodiment, the identification information may indicate that the first channel signal or the second channel signal is a channel signal whose initial reverberation gain parameter needs to be adjusted, or may indicate that the first channel signal and the second channel signal are channel signals whose initial reverberation gain parameters need to be adjusted, or may indicate that a reverberation gain parameter does not need to be adjusted for both the first channel signal and the second channel signal.

In some embodiments, the identification information may indicate, using a value of an identifier field, a channel signal that is in a plurality of channel signals and whose initial reverberation gain parameter needs to be adjusted. For example, the identifier field of the identification information occupies two bits. When the value of the identifier field is 00, it indicates that neither the initial reverberation gain parameter of the first channel signal nor the initial reverberation gain parameter of the second channel signal needs to be adjusted. When the value of the identifier field is 01, it indicates that only the initial reverberation gain parameter of the first channel signal needs to be adjusted. When the value of the identifier field is 10, it indicates that only the initial reverberation gain parameter of the second channel signal needs to be adjusted. When the value of the identifier field is 11, it indicates that both the initial reverberation gain parameter of the first channel signal and the second channel signal need to be adjusted.

In some embodiments, the determining identification information of the first channel signal and the second channel signal based on a correlation between the first channel signal and the downmixed signal, and a correlation between the second channel signal and the downmixed signal includes determining the identification information of the first channel signal and the second channel signal based on correlations between the energy of the first channel signal and the energy of the downmixed signal and between the energy of the second channel signal and the energy of the downmixed signal.

The correlation between the first channel signal and the downmixed signal and the correlation between the second channel signal and the downmixed signal can be conveniently measured using the energy of the channel signals and the energy of the downmixed signal such that a channel signal whose initial reverberation gain parameter needs to be adjusted can be conveniently determined.

In some embodiments, the energy or amplitude of the downmixed signal may be calculated based on the energy of the first channel signal and the energy of the second channel signal, thereby simplifying a calculation process. Alternatively, the energy of the downmixed signal may be directly calculated based on the downmixed signal itself.

630. Quantize the first channel signal and the second channel signal based on the downmixed signal, the initial reverberation gain parameter, and the identification information, and write a quantized first channel signal and a quantized second channel signal into a bitstream.

In this application, by determining a relationship between a preset threshold and a size of a difference value between energy of a channel signal and the energy of the downmixed signal, the channel signal can be determined as a channel signal whose initial reverberation gain parameter needs to be adjusted, when the energy of the channel signal is greatly different from the energy of the downmixed signal. Therefore, a decoder side can first adjust an initial reverberation gain parameter of the channel signal and then perform reverberation processing on the channel signal, thereby improving quality of a channel signal obtained after reverberation processing.

Optionally, in an embodiment, the determining the identification information of the first channel signal and the second channel signal based on correlations between the energy of the first channel signal and the energy of the downmixed signal and between the energy of the second channel signal and the energy of the downmixed signal includes determining a first difference value and a second difference value, where the first difference value is a sum of absolute values of difference values between energy of the first channel signal and energy of the downmixed signal at a plurality of frequency bins, and the second difference value is a sum of absolute values of difference values between energy of the second channel signal and energy of the downmixed signal at the plurality of frequency bins, and determining the identification information of the first channel signal and the second channel signal based on the first difference value and the second difference value.

The difference between the energy of the first channel signal and the energy of the downmixed signal and the difference between the energy of the second channel signal and the energy of the downmixed signal can be conveniently determined by comparing the difference values between the energy of the first channel signal and the energy of the downmixed signal at the plurality of frequency bins and the energy of the second channel signal and the energy of the downmixed signal at the plurality of frequency bins to determine a channel signal whose initial reverberation gain parameter needs to be adjusted. Therefore, it is unnecessary to compare differences between energy of the first channel signal and energy of the downmixed signal and differences between energy of the second channel signal and energy of the downmixed signal in all frequency bands.

Optionally, the determining the identification information of the first channel signal and the second channel signal based on the first difference value and the second difference value includes determining the larger difference value in the first difference value and the second difference value as a target difference value, and determining the identification information based on the target difference value, where the identification information indicates a channel signal corresponding to the target difference value, and the channel signal corresponding to the target difference value is a channel signal whose initial reverberation gain parameter needs to be adjusted.

In an embodiment, when the sum of the absolute values of the difference values between the energy of the first channel signal and the energy of the downmixed signal at the plurality of frequency bins is greater than the sum of the absolute values of the difference values between the energy of the second channel signal and the energy of the downmixed signal at the plurality of frequency bins, the first channel signal may be determined as a channel signal whose initial reverberation gain parameter needs to be adjusted.

In addition, when both the sum of the absolute values of the difference values between the energy of the first channel signal and the energy of the downmixed signal at the plurality of frequency bins, and the sum of the absolute values of the difference values between the energy of the second channel signal and the energy of the downmixed signal at the plurality of frequency bins are relatively large (for example, both are greater than the preset threshold), another piece of identification information may be determined, and the identification information indicates that both the initial reverberation gain parameter of the first channel signal and the second channel signal need to be adjusted.

In some embodiments, the determining the identification information of the first channel signal and the second channel signal based on the sum of the absolute values of the difference values between the energy of the first channel signal or the energy of the second channel signal and the energy of the downmixed signal at the plurality of frequency bins includes generating first identification information when the sum of the absolute values of the difference values between the energy of the first channel signal and the energy of the downmixed signal at the plurality of frequency bins is greater than the preset threshold, where the first identification information indicates that the initial reverberation gain parameter of the first channel signal needs to be adjusted, and generating second identification information when the sum of the absolute values of the difference values between the energy of the second channel signal and the energy of the downmixed signal at the plurality of frequency bins is greater than the preset threshold, where the second identification information indicates that the initial reverberation gain parameter of the second channel signal needs to be adjusted.

By determining a relationship between the preset threshold and a size of a difference value between energy of a channel signal and the energy of the downmixed signal, the channel signal can be determined as a channel signal whose initial reverberation gain parameter needs to be adjusted, when the energy of the channel signal is greatly different from the energy of the downmixed signal. Therefore, a decoder side can first adjust an initial reverberation gain parameter of the channel signal and then perform reverberation processing on the channel signal, thereby improving quality of a channel signal obtained after reverberation processing.

It should be understood that the identification information of the first channel signal and the second channel signal may be one piece of identification information or two pieces of identification information. For example, when both the initial reverberation gain parameter of the first channel signal and the second channel signal need to be adjusted, the identification information of the first channel signal and the second channel signal may be one piece of identification information, and the identification information indicates that both the initial reverberation gain parameter of the first channel signal and the second channel signal need to be adjusted. Alternatively, the identification information of the first channel signal and the second channel signal is two pieces of identification information first identification information and second identification information respectively, the first identification information indicates that the initial reverberation gain parameter of the first channel signal needs to be adjusted, and the second identification information indicates that the initial reverberation gain parameter of the second channel signal needs to be adjusted. When a channel signal has no corresponding identification information, it indicates that an initial reverberation gain parameter of the channel signal does not need to be adjusted. That is, when the identification information includes only the first identification information, the initial reverberation gain parameter of only the first channel signal in the first channel signal and the second channel signal needs to be adjusted.

Optionally, in some embodiments, when the initial reverberation gain parameter of the first channel signal needs to be adjusted, the method in FIG. 6 further includes determining a target attenuation factor based on the first difference value and the second difference value, where the target attenuation factor is used to adjust an initial reverberation gain parameter of a target channel signal, and quantizing the target attenuation factor, and writing a quantized target attenuation factor into the bitstream.

The initial reverberation gain parameter of the channel signal can be flexibly adjusted based on a value of the correlation between the channel signal and the downmixed signal using the attenuation factor.

It should be understood that the first difference value and the second difference value may be calculated by referring to Formula (1) and Formula (2) in the foregoing.

When the target attenuation factor is being determined based on the first difference value and the second difference value, the target attenuation factor may be determined based on a ratio between the first difference value and the second difference value.

In some embodiments, the target attenuation factor includes a plurality of attenuation factors, each of the plurality of attenuation factors corresponds to at least one subband of the target channel signal, and any subband corresponds to only one attenuation factor. For example, the multi-channel signal includes a plurality of subbands, and adjacent subbands may correspond to one attenuation factor.

When the target attenuation factor includes a plurality of attenuation factors, a reverberation gain parameter can be more flexibly adjusted based on the target attenuation factor.

In some other embodiments, the target channel signal includes a first frequency band and a second frequency band, an attenuation factor corresponding to a subband in the first frequency band is less than or equal to an attenuation factor corresponding to a subband in the second frequency band, and a frequency of the first frequency band is less than a frequency of the second frequency band.

Reverberation gain parameters corresponding to a high frequency subband and a low frequency subband can be adjusted to different degrees by setting attenuation factors of different sizes for the reverberation gain parameters corresponding to the high frequency subband and the low frequency subband, and a better processing effect can be obtained during reverberation processing.

For example, a frequency band in which the target channel signal is located includes a low frequency part and a high frequency part, and the target attenuation factor includes a plurality of attenuation factors. The low frequency part corresponds to at least one attenuation factor, the high frequency part corresponds to at least one attenuation factor, and the attenuation factor corresponding to the low frequency part is less than the attenuation factor corresponding to the high frequency part.

In some embodiments, the energy of the downmixed signal is determined based on the energy of the first channel signal and the energy of the second channel signal.

The energy of the downmixed signal can be calculated using the energy of the first channel signal and the energy of the second channel signal, and a calculation process can be simplified without using the downmixed signal itself.

The foregoing describes the encoding method in the embodiment of this application in detail with reference to FIG. 6. The following describes a decoding method in the embodiment of this application with reference to FIG. 7. It should be understood that the decoding method in FIG. 7 corresponds to the encoding method in FIG. 6. For brevity, repeated descriptions are properly omitted below.

Figure 7:
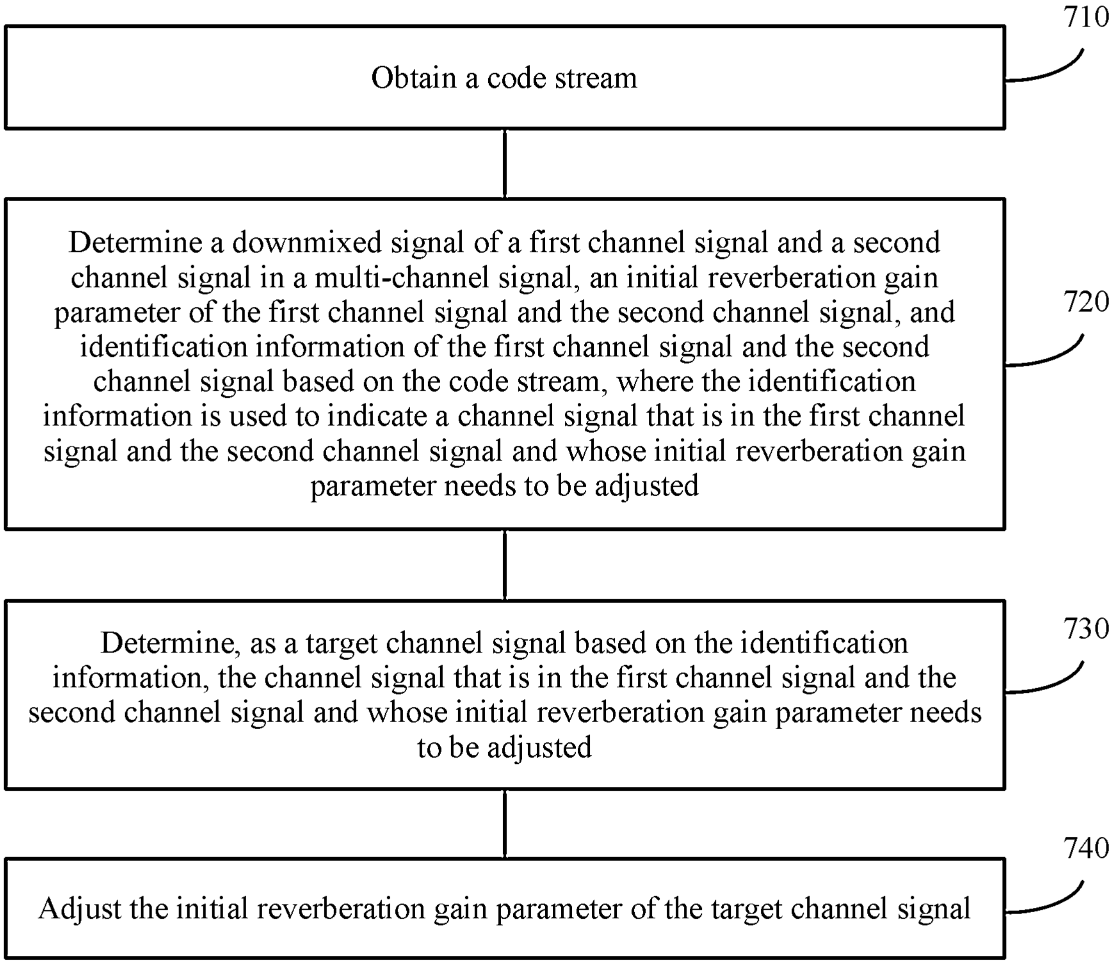
FIG. 7 is a schematic flowchart of a multi-channel signal decoding method according to an embodiment of this application.

FIG. 7 is a schematic flowchart of a multi-channel signal decoding method according to an embodiment of this application. The method in FIG. 7 may be performed by a decoder-side device or a decoder. The method in FIG. 7 includes the following steps.

710. Obtain a bitstream.

720. Determine a downmixed signal of a first channel signal and a second channel signal in a multi-channel signal, an initial reverberation gain parameter of the first channel signal and the second channel signal, and identification information of the first channel signal and the second channel signal based on the bitstream, where the identification information indicates a channel signal that is in the first channel signal and the second channel signal and whose initial reverberation gain parameter needs to be adjusted.

730. Determine, as a target channel signal based on the identification information, the channel signal that is in the first channel signal and the second channel signal and whose initial reverberation gain parameter needs to be adjusted.

740. Adjust the initial reverberation gain parameter of the target channel signal.

In this application, the channel signal whose initial reverberation gain parameter needs to be adjusted can be determined using the identification information, and the initial reverberation gain parameter of the channel signal is adjusted before reverberation processing is performed on the channel signal, thereby improving quality of a channel signal obtained after reverberation processing.

Optionally, in an embodiment, the adjusting an initial reverberation gain parameter of the target channel signal includes determining a target attenuation factor, and adjusting the initial reverberation gain parameter of the target channel signal based on the target attenuation factor, to obtain a target reverberation gain parameter of the target channel signal.

The initial reverberation gain parameter of the channel signal can be flexibly adjusted based on a size of a correlation between the channel signal and the downmixed signal using the attenuation factor.

When determining the attenuation factor, the decoder side may determine a preset attenuation factor as the target attenuation factor. Alternatively, the decoder side directly adjusts the initial reverberation gain parameter of the target channel signal based on a preset attenuation factor.

A process of determining the target attenuation factor can be simplified by presetting the attenuation factor, thereby improving decoding efficiency.

In some embodiments, the decoder side may obtain the target attenuation factor from bitstreams of a plurality of channel signals, that is, obtain the target attenuation factor by decoding the bitstreams of the plurality of channel signals. In this case, an encoder side has determined the target attenuation factor, and encodes the target attenuation factor to obtain and transmit the bitstream to the decoder side. In this way, the decoder side does not need to calculate the target attenuation factor any more, but directly decodes the bitstream to obtain the target attenuation factor.

When the bitstream includes the target attenuation factor, the target attenuation factor may be directly obtained from the bitstream, and the process of determining the target attenuation factor can be also simplified, thereby improving decoding efficiency.

Optionally, in an embodiment, the determining a target attenuation factor includes obtaining an inter-channel level difference between the first channel signal and the second channel signal from the bitstream, and determining the target attenuation factor based on the inter-channel level difference, or determining the target attenuation factor based on the inter-channel level difference and the downmixed signal.

The target attenuation factor can be more flexibly and accurately determined based on the inter-channel level difference, the downmixed signal, and the like such that an initial reverberation gain parameter of a channel signal can be more accurately adjusted based on the attenuation factor.

In an embodiment, when the inter-channel level difference is relatively large, it may be considered that a difference between the first channel signal and the second channel signal is relatively large, and a correlation between the first channel signal and the second channel signal is relatively small. In this case, an attenuation factor with a relatively large value may be determined as the target attenuation factor.

In addition, when the target attenuation factor is being determined based on the downmixed signal, the target attenuation factor may be determined using periodicity and harmonicity of the downmixed signal. For example, when the periodicity or the harmonicity of the downmixed signal is good, it may be considered that the difference between the first channel signal and the second channel signal is relatively small, and the correlation between the first channel signal and the second channel signal is relatively large. In this case, an attenuation factor with a relatively small value may be determined as the target attenuation factor.

Optionally, in an embodiment, the target attenuation factor includes a plurality of attenuation factors, each of the plurality of attenuation factors corresponds to at least one subband of the target channel signal, and any subband corresponds to only one attenuation factor. For example, each of the first channel signal and the second channel signal includes a plurality of subbands, and a plurality of adjacent subbands may correspond to one attenuation factor.

When the target attenuation factor includes a plurality of attenuation factors, a reverberation gain parameter can be more flexibly adjusted based on the target attenuation factor.

In some other embodiments, the target channel signal includes a first frequency band and a second frequency band, an attenuation factor corresponding to a subband in the first frequency band is less than or equal to an attenuation factor corresponding to a subband in the second frequency band, and a frequency of the first frequency band is less than a frequency of the second frequency band.

Reverberation gain parameters corresponding to a high frequency subband and a low frequency subband can be adjusted to different degrees by setting attenuation factors of different sizes for the reverberation gain parameters corresponding to the high frequency subband and the low frequency subband, and a better processing effect can be obtained during reverberation processing.

For example, a frequency band in which the target channel signal is located includes a low frequency part and a high frequency part, and the target attenuation factor includes a plurality of attenuation factors. The low frequency part corresponds to at least one attenuation factor, the high frequency part corresponds to at least one attenuation factor, and the attenuation factor corresponding to the low frequency part is less than the attenuation factor corresponding to the high frequency part.

The foregoing describes the encoding method and the decoding method in the embodiments of this application in detail with reference to FIG. 3 to FIG. 7. The following describes an encoder and a decoder in the embodiments of this application with reference to FIG. 8 to FIG. 13. It should be understood that the encoder and the decoder in FIG. 8 to FIG. 13 can implement steps performed by the encoder and the decoder in the encoding method and the decoding method in the embodiments of this application. For brevity, repeated descriptions are properly omitted below.

Figure 8:
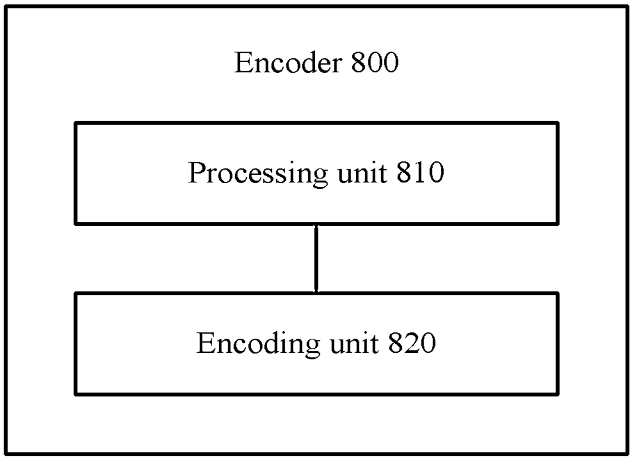
FIG. 8 is a schematic block diagram of an encoder according to an embodiment of this application.

FIG. 8 is a schematic block diagram of an encoder according to an embodiment of this application. An encoder 800 in FIG. 8 includes a processing unit 810, configured to determine a downmixed signal of a first channel signal and a second channel signal in a multi-channel signal, an initial reverberation gain parameter of the first channel signal and the second channel signal, where the processing unit 810 is further configured to determine a target reverberation gain parameter of the first channel signal and the second channel signal based on a correlation between the first channel signal and the downmixed signal, a correlation between the second channel signal and the downmixed signal, and the initial reverberation gain parameter, and an encoding unit 820, configured to quantize the first channel signal and the second channel signal based on the downmixed signal and the target reverberation gain parameter, and write a quantized first channel signal and a quantized second channel signal into a bitstream.

The encoder 800 may correspond to the multi-channel signal encoding method in FIG. 3, and the encoder 800 may perform the multi-channel signal encoding method in FIG. 3.

In this application, when a target reverberation gain parameter of a channel signal is being determined, a correlation between the channel signal and the downmixed signal is considered. In this way, a better processing effect can be obtained when reverberation processing is performed on the channel signal based on the target reverberation gain parameter, thereby improving quality of a channel signal obtained after reverberation processing.

Optionally, in an embodiment, the processing unit 810 is configured to determine a target attenuation factor based on the correlation between the first channel signal and the downmixed signal and the correlation between the second channel signal and the downmixed signal, and adjust the initial reverberation gain parameter based on the target attenuation factor to obtain the target reverberation gain parameter.

Optionally, in an embodiment, each of the first channel signal and the second channel signal includes a plurality of frequency bins, and the processing unit 810 is configured to determine difference values between energy of the first channel signal and energy of the downmixed signal at the plurality of frequency bins and between energy of the second channel signal and energy of the downmixed signal at the plurality of frequency bins, and determine the target attenuation factor based on the difference values.

Optionally, in an embodiment, the processing unit 810 is configured to determine a first difference value between the energy of the first channel signal and the energy of the downmixed signal, where the first difference value indicates a sum of absolute values of the difference values between the energy of the first channel signal and the energy of the downmixed signal at the plurality of frequency bins, determine a second difference value between the energy of the second channel signal and the energy of the downmixed signal, where the second difference value indicates a sum of absolute values of the difference values between the energy of the second channel signal and the energy of the downmixed signal at the plurality of frequency bins, and determine the target attenuation factor based on a ratio between the first difference value and the second difference value.

Optionally, in an embodiment, before determining the target attenuation factor based on the difference values, the processing unit 810 is further configured to determine that the difference values are greater than a preset threshold.

Optionally, in an embodiment, the energy of the downmixed signal is determined based on the energy of the first channel signal and the energy of the second channel signal.

Optionally, in an embodiment, the target attenuation factor includes a plurality of attenuation factors, each of the plurality of attenuation factors corresponds to at least one subband of the multi-channel signal, and any subband corresponds to only one attenuation factor.

Figure 9:
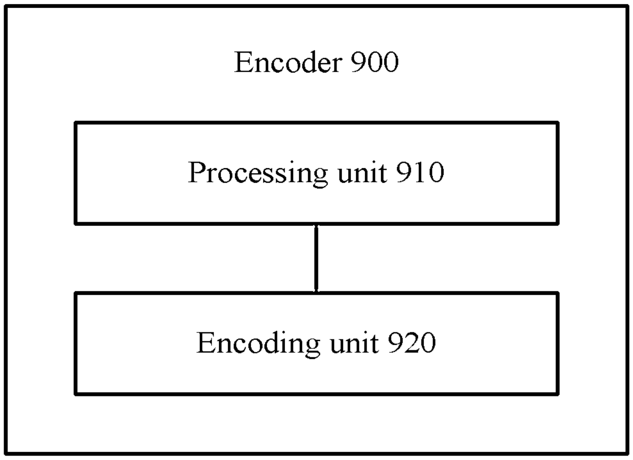
FIG. 9 is a schematic block diagram of an encoder according to an embodiment of this application.

FIG. 9 is a schematic block diagram of an encoder according to an embodiment of this application. An encoder 900 in FIG. 9 includes a processing unit 910, configured to determine a downmixed signal of a first channel signal and a second channel signal in a multi-channel signal, an initial reverberation gain parameter of the first channel signal and the second channel signal, where the processing unit 910 is further configured to determine identification information of the first channel signal and the second channel signal based on a correlation between the first channel signal and the downmixed signal, and a correlation between the second channel signal and the downmixed signal, where the identification information indicates a channel signal that is in the first channel signal and the second channel signal and whose initial reverberation gain parameter needs to be adjusted, and an encoding unit 920, configured to quantize the first channel signal and the second channel signal based on the downmixed signal, the initial reverberation gain parameter, and the identification information, and write a quantized first channel signal and a quantized second channel signal into a bitstream.

In this application, a channel signal whose initial reverberation gain parameter needs to be adjusted can be determined based on a correlation between the channel signal and the downmixed signal such that a decoder side can first adjust initial reverberation gain parameter of some channel signals and then perform reverberation processing on these channel signals, thereby improving quality of a channel signal obtained after reverberation processing.

It should be understood that the encoder 900 may correspond to the multi-channel signal encoding method in FIG. 6, and the encoder 900 may perform the multi-channel signal encoding method in FIG. 6.

Optionally, in an embodiment, the processing unit 910 is configured to determine the identification information of the first channel signal and the second channel signal based on a correlation between energy of the first channel signal and energy of the downmixed signal and a correlation between energy of the second channel signal and the energy of the downmixed signal.

Optionally, in an embodiment, the processing unit 910 is configured to determine a first difference value and a second difference value, where the first difference value is a sum of absolute values of difference values between energy of the first channel signal and energy of the downmixed signal at a plurality of frequency bins, and the second difference value is a sum of absolute values of difference values between energy of the second channel signal and energy of the downmixed signal at the plurality of frequency bins, and determine the identification information of the first channel signal and the second channel signal based on the first difference value and the second difference value.

Optionally, in an embodiment, the processing unit 910 is configured to determine the larger difference value in the first difference value and the second difference value as a target difference value, and determine the identification information based on the target difference value, where the identification information indicates a channel signal corresponding to the target difference value, and the channel signal corresponding to the target difference value is a channel signal whose initial reverberation gain parameter needs to be adjusted.

Optionally, in an embodiment, the processing unit 910 is further configured to determine a target attenuation factor based on the first difference value and the second difference value, where the target attenuation factor is used to adjust an initial reverberation gain parameter of a target channel signal, and quantize the target attenuation factor, and write a quantized target attenuation factor into the bitstream.

Optionally, in an embodiment, the target attenuation factor includes a plurality of attenuation factors, each of the plurality of attenuation factors corresponds to at least one subband of the target channel signal, and any subband corresponds to only one attenuation factor.

Optionally, in an embodiment, the energy of the downmixed signal is determined based on the energy of the first channel signal and the energy of the second channel signal.

Figure 10:
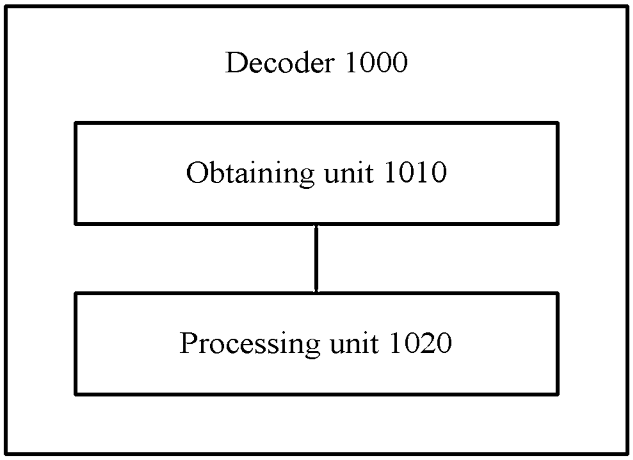
FIG. 10 is a schematic block diagram of a decoder according to an embodiment of this application.

FIG. 10 is a schematic block diagram of a decoder according to an embodiment of this application. A decoder 1000 in FIG. 10 includes an obtaining unit 1010, configured to obtain a bitstream, and a processing unit 1020, configured to determine a downmixed signal of a first channel signal and a second channel signal in a multi-channel signal, an initial reverberation gain parameter of the first channel signal and the second channel signal, and identification information of the first channel signal and the second channel signal based on the bitstream, where the identification information indicates a channel signal that is in the first channel signal and the second channel signal and whose initial reverberation gain parameter needs to be adjusted, where the processing unit 1020 is further configured to determine, as a target channel signal based on the identification information, the channel signal that is in the first channel signal and the second channel signal and whose initial reverberation gain parameter needs to be adjusted, and the processing unit 1020 is further configured to adjust the initial reverberation gain parameter of the target channel signal.

In this application, the channel signal whose initial reverberation gain parameter needs to be adjusted can be determined using the identification information, and the initial reverberation gain parameter of the channel signal is adjusted before reverberation processing is performed on the channel signal, thereby improving quality of a channel signal obtained after reverberation processing.

It should be understood that the decoder 1000 may correspond to the multi-channel signal decoding method in FIG. 7, and the decoder 1000 may perform the multi-channel signal decoding method in FIG. 7.

Optionally, in an embodiment, the processing unit 1020 is configured to determine a target attenuation factor, and adjust the initial reverberation gain parameter of the target channel signal based on the target attenuation factor, to obtain a target reverberation gain parameter of the target channel signal.

Optionally, in an embodiment, the processing unit 1020 is configured to determine a preset attenuation factor as the target attenuation factor.

Optionally, in an embodiment, the processing unit 1020 is configured to obtain the target attenuation factor based on the bitstream.

Optionally, in an embodiment, the processing unit 1020 is configured to obtain an inter-channel level difference between the first channel signal and the second channel signal from the bitstream, and determine the target attenuation factor based on the inter-channel level difference, or determine the target attenuation factor based on the inter-channel level difference and the downmixed signal.

Optionally, in an embodiment, the target attenuation factor includes a plurality of attenuation factors, each of the plurality of attenuation factors corresponds to at least one subband of the target channel signal, and any subband corresponds to only one attenuation factor.

Figure 11:
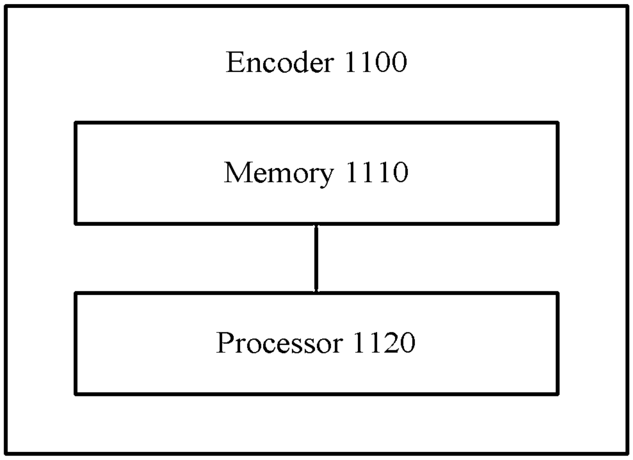
FIG. 11 is a schematic block diagram of an encoder according to an embodiment of this application.

FIG. 11 is a schematic block diagram of an encoder according to an embodiment of this application. An encoder 1100 in FIG. 11 includes a memory 1110, configured to store a program, and a processor 1120, configured to execute the program, and when the program is executed, the processor 1120 is configured to determine a downmixed signal of a first channel signal and a second channel signal in a multi-channel signal, an initial reverberation gain parameter of the first channel signal and the second channel signal, determine a target reverberation gain parameter of the first channel signal and the second channel signal based on a correlation between the first channel signal and the downmixed signal, a correlation between the second channel signal and the downmixed signal, and the initial reverberation gain parameter, and quantize the first channel signal and the second channel signal based on the downmixed signal and the target reverberation gain parameter, and write a quantized first channel signal and a quantized second channel signal into a bitstream.

The encoder 1100 may correspond to the multi-channel signal encoding method in FIG. 3, and the encoder 1100 may perform the multi-channel signal encoding method in FIG. 3.

In this application, when a target reverberation gain parameter of a channel signal is being determined, a correlation between the channel signal and the downmixed signal is considered. In this way, a better processing effect can be obtained when reverberation processing is performed on the channel signal based on the target reverberation gain parameter, thereby improving quality of a channel signal obtained after reverberation processing.

Optionally, in an embodiment, the processor 1120 is configured to determine a target attenuation factor based on the correlation between the first channel signal and the downmixed signal and the correlation between the second channel signal and the downmixed signal, and adjust the initial reverberation gain parameter based on the target attenuation factor to obtain the target reverberation gain parameter.

Optionally, in an embodiment, each of the first channel signal and the second channel signal includes a plurality of frequency bins, and the processor 1120 is configured to determine difference values between energy of the first channel signal and energy of the downmixed signal at the plurality of frequency bins and between energy of the second channel signal and energy of the downmixed signal at the plurality of frequency bins, and determine the target attenuation factor based on the difference values.

Optionally, in an embodiment, the processor 1120 is configured to determine a first difference value between the energy of the first channel signal and the energy of the downmixed signal, where the first difference value indicates a sum of absolute values of the difference values between the energy of the first channel signal and the energy of the downmixed signal at the plurality of frequency bins, determine a second difference value between the energy of the second channel signal and the energy of the downmixed signal, where the second difference value indicates a sum of absolute values of the difference values between the energy of the second channel signal and the energy of the downmixed signal at the plurality of frequency bins, and determine the target attenuation factor based on a ratio between the first difference value and the second difference value.

Optionally, in an embodiment, before determining the target attenuation factor based on the difference values, the processor 1120 is further configured to determine that the difference values are greater than a preset threshold.

Optionally, in an embodiment, the energy of the downmixed signal is determined based on the energy of the first channel signal and the energy of the second channel signal.

Optionally, in an embodiment, the target attenuation factor includes a plurality of attenuation factors, each of the plurality of attenuation factors corresponds to at least one subband of the multi-channel signal, and any subband corresponds to only one attenuation factor.

Figure 12:
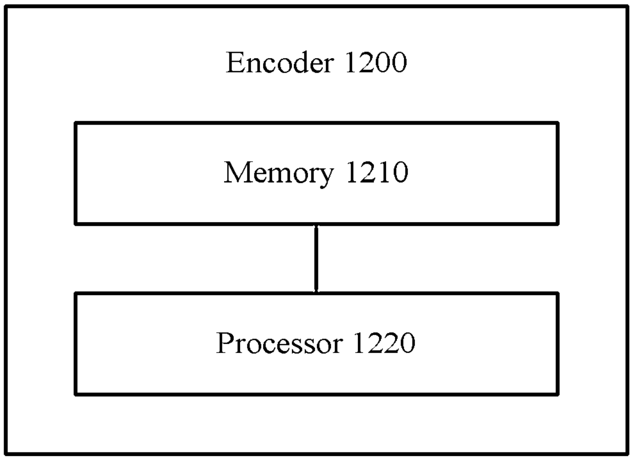
FIG. 12 is a schematic block diagram of an encoder according to an embodiment of this application.

FIG. 12 is a schematic block diagram of an encoder according to an embodiment of this application. An encoder 1200 in FIG. 12 includes a memory 1210, configured to store a program, and a processor 1220, configured to execute the program, and when the program is executed, the processor 1220 is configured to determine a downmixed signal of a first channel signal and a second channel signal in a multi-channel signal, an initial reverberation gain parameter of the first channel signal and the second channel signal, determine identification information of the first channel signal and the second channel signal based on a correlation between the first channel signal and the downmixed signal, and a correlation between the second channel signal and the downmixed signal, where the identification information indicates a channel signal that is in the first channel signal and the second channel signal and whose initial reverberation gain parameter needs to be adjusted, and quantize the first channel signal and the second channel signal based on the downmixed signal, the initial reverberation gain parameter, and the identification information, and write a quantized first channel signal and a quantized second channel signal into a bitstream.

In this application, a channel signal whose initial reverberation gain parameter needs to be adjusted can be determined based on a correlation between the channel signal and the downmixed signal such that a decoder side can first adjust initial reverberation gain parameter of some channel signals and then perform reverberation processing on these channel signals, thereby improving quality of a channel signal obtained after reverberation processing.

It should be understood that the encoder 1200 may correspond to the multi-channel signal encoding method in FIG. 6, and the encoder 1200 may perform the multi-channel signal encoding method in FIG. 6.

Optionally, in an embodiment, the processor 1220 is configured to determine the identification information of the first channel signal and the second channel signal based on a correlation between energy of the first channel signal and energy of the downmixed signal and a correlation between energy of the second channel signal and the energy of the downmixed signal.

Optionally, in an embodiment, the processor 1220 is configured to determine a first difference value and a second difference value, where the first difference value is a sum of absolute values of difference values between energy of the first channel signal and energy of the downmixed signal at a plurality of frequency bins, and the second difference value is a sum of absolute values of difference values between energy of the second channel signal and energy of the downmixed signal at the plurality of frequency bins, and determine the identification information of the first channel signal and the second channel signal based on the first difference value and the second difference value.

Optionally, in an embodiment, the processor 1220 is configured to determine the larger difference value in the first difference value and the second difference value as a target difference value, and determine the identification information based on the target difference value, where the identification information indicates a channel signal corresponding to the target difference value, and the channel signal corresponding to the target difference value is a channel signal whose initial reverberation gain parameter needs to be adjusted.

Optionally, in an embodiment, the processor 1220 is further configured to determine a target attenuation factor based on the first difference value and the second difference value, where the target attenuation factor is used to adjust an initial reverberation gain parameter of a target channel signal, and quantize the target attenuation factor, and write a quantized target attenuation factor into the bitstream.

Optionally, in an embodiment, the target attenuation factor includes a plurality of attenuation factors, each of the plurality of attenuation factors corresponds to at least one subband of the target channel signal, and any subband corresponds to only one attenuation factor.

Optionally, in an embodiment, the energy of the downmixed signal is determined based on the energy of the first channel signal and the energy of the second channel signal.

Figure 13:
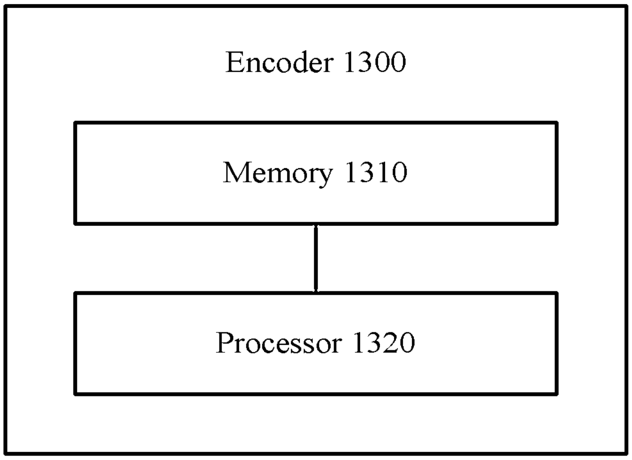
FIG. 13 is a schematic block diagram of a decoder according to an embodiment of this application.

FIG. 13 is a schematic block diagram of a decoder according to an embodiment of this application. A decoder 1300 in FIG. 13 includes a memory 1310, configured to store a program, and a processor 1320, configured to execute the program, and when the program is executed, the processor 1320 is configured to obtain a bitstream, determine a downmixed signal of a first channel signal and a second channel signal in a multi-channel signal, an initial reverberation gain parameter of the first channel signal and the second channel signal, and identification information of the first channel signal and the second channel signal based on the bitstream, where the identification information indicates a channel signal that is in the first channel signal and the second channel signal and whose initial reverberation gain parameter needs to be adjusted, determine, as a target channel signal based on the identification information, the channel signal that is in the first channel signal and the second channel signal and whose initial reverberation gain parameter needs to be adjusted, and adjust the initial reverberation gain parameter of the target of channel signal.

In this application, the channel signal whose initial reverberation gain parameter needs to be adjusted can be determined using the identification information, and the initial reverberation gain parameter of the channel signal is adjusted before reverberation processing is performed on the channel signal, thereby improving quality of a channel signal obtained after reverberation processing.

It should be understood that the decoder 1300 may correspond to the multi-channel signal decoding method in FIG. 7, and the decoder 1300 may perform the multi-channel signal decoding method in FIG. 7.

Optionally, in an embodiment, the processor 1320 is configured to determine a target attenuation factor, and adjust the initial reverberation gain parameter of the target channel signal based on the target attenuation factor, to obtain a target reverberation gain parameter of the target channel signal.

Optionally, in an embodiment, the processor 1320 is configured to determine a preset attenuation factor as the target attenuation factor.

Optionally, in an embodiment, the processor 1320 is configured to obtain the target attenuation factor based on the bitstream.

Optionally, in an embodiment, the processor 1320 is configured to obtain an inter-channel level difference between the first channel signal and the second channel signal from the bitstream, and determine the target attenuation factor based on the inter-channel level difference, or determine the target attenuation factor based on the inter-channel level difference and the downmixed signal.

Optionally, in an embodiment, the target attenuation factor includes a plurality of attenuation factors, each of the plurality of attenuation factors corresponds to at least one subband of the target channel signal, and any subband corresponds to only one attenuation factor.

A person of ordinary skill in the art may be aware that, in combination with the examples of units and algorithm steps described in the embodiments disclosed in this specification, the embodiments may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method, comprising:

obtaining a current frame of a multi-channel signal, wherein the current frame comprises a first channel signal and a second channel signal;

obtaining, based on the first channel signal and the second channel signal, a downmixed signal of the current frame;

obtaining an initial reverberation gain parameter of the current frame, wherein the initial reverberation gain parameter corresponds to different subbands of the first channel signal and the second channel signal;

obtaining, based on a first correlation between the first channel signal and the downmixed signal and a second correlation between the second channel signal and the downmixed signal, a value of an identification flag, wherein the identification flag comprises one bit to indicate that the initial reverberation gain parameter of one of the first channel signal or the second channel signal needs to be adjusted;

quantizing, based on the downmixed signal, the initial reverberation gain parameter, and the value of the identification flag, the first channel signal and the second channel signal to obtain a quantized first channel signal and a quantized second channel signal; and writing, into a bitstream, the quantized first channel signal and the quantized second channel signal.

2. The method of claim 1, wherein the first correlation is a first energy correlation between a first energy of the first channel signal and a second energy of the downmixed signal, or wherein the second correlation is a second energy correlation between a third energy of the second channel signal and the second energy.

3. The method of claim 2, further comprising:

obtaining first absolute values of first difference values between the first energy and the second energy at a plurality of frequency bins;

obtaining a first sum of the first absolute values as the first energy correlation;

obtaining second absolute values of second difference values between the third energy and the second energy at the plurality of frequency bins; and obtaining a second sum of the second absolute values as the second energy correlation.

4. The method of claim 3, wherein obtaining the value of the identification flag comprises obtaining, based on a larger one of the first sum or the second sum, the value of the identification flag, and wherein the value of the identification flag indicates which of the first channel signal or the second channel signal corresponds to the larger one.

5. The method of claim 4, further comprising:

obtaining, based on the first sum and the second sum, an attenuation factor configured to adjust the initial reverberation gain parameter of the larger one of the first channel signal or the second channel signal;

quantizing the attenuation factor to obtain a quantized attenuation factor; and writing, into the bitstream, the quantized attenuation factor.

6. The method of claim 4, further comprising:

obtaining, based on the first sum and the second sum, a plurality of attenuation factors, wherein each of the plurality of attenuation factors corresponds to at least one subband of the larger one of the first channel signal or the second channel signal, and wherein each of the at least one subband corresponds to only one attenuation factor;

quantizing the plurality of attenuation factors to obtain a plurality of quantized attenuation factors; and writing, into the bitstream, the plurality of quantized attenuation factors.

7. The method of claim 2, further comprising determining, based on the first energy and the third energy, the second energy.

8. A computer program product comprising instructions that are stored on a non-transitory computer-readable medium and that, when executed by a processor, cause an encoder to:

obtain a current frame of a multi-channel signal, wherein the current frame comprises a first channel signal and a second channel signal;

obtain, based on the first channel signal and the second channel signal, a downmixed signal of the current frame;

obtain an initial reverberation gain parameter of the current frame, wherein the initial reverberation gain parameter corresponds to different subbands of the first channel signal and the second channel signal;

obtain, based on a first correlation between the first channel signal and the downmixed signal and a second correlation between the second channel signal and the downmixed signal, a value of an identification flag, wherein the identification flag comprises one bit to indicate that the initial reverberation gain parameter of one of the first channel signal or the second channel signal needs to be adjusted;

quantize, based on the downmixed signal, the initial reverberation gain parameter, and the value of the identification flag, the first channel signal and the second channel signal to obtain a quantized first channel signal and a quantized second channel signal; and write, into a bitstream, the quantized first channel signal and the quantized second channel signal.

9. The computer program product of claim 8, wherein the first correlation is a first energy correlation between a first energy of the first channel signal and a second energy of the downmixed signal, or wherein the second correlation is a second energy correlation between a third energy of the second channel signal and the second energy.

10. The computer program product of claim 9, wherein when executed by the processor, the instructions further cause the encoder to:

obtain first absolute values of first difference values between the first energy and the second energy at a plurality of frequency bins;

obtain a first sum of the first absolute values as the first energy correlation;

obtain second absolute values of second difference values between the third energy and the second energy at the plurality of frequency bins; and obtain a second sum of the second absolute values as the second energy correlation.

11. The computer program product of claim 10, wherein when executed by the processor, the instructions further cause the encoder to obtain, based on a larger one of the first sum and the second sum, the value of the identification flag, and wherein the value of the identification flag indicates which of the first channel signal or the second channel signal corresponds to the larger one.

12. The computer program product of claim 11, wherein when executed by the processor, the instructions further cause the encoder to:

obtain, based on the first sum and the second sum, an attenuation factor configured to adjust the initial reverberation gain parameter of the larger one of the first channel signal or the second channel signal;

quantize the attenuation factor to obtain a quantized attenuation factor; and write, into the bitstream, the quantized attenuation factor.

13. The computer program product of claim 11, wherein when executed by the processor, the instructions further cause the encoder to:

obtain, based on the first sum and the second sum, a plurality of attenuation factors, wherein each of the plurality of attenuation factors corresponds to at least one subband of the larger one of the first channel signal or the second channel signal, and wherein each of the at least one subband corresponds to only one attenuation factor;

quantize the plurality of attenuation factors to obtain a plurality of quantized attenuation factors; and write, into the bitstream, the plurality of quantized attenuation factors.

14. An encoder, comprising:

at least one processor; and one or more memories coupled to the at least one processor and configured to store programming instructions, that when executed by the at least one processor, cause the encoder to:

obtain a current frame of a multi-channel signal, wherein the current frame comprises a first channel signal and a second channel signal;

obtain, based on the first channel signal and the second channel signal, a downmixed signal of the current frame;

obtain an initial reverberation gain parameter of the current frame, wherein the initial reverberation gain parameter corresponds to different subbands of the first channel signal and the second channel signal;

obtain, based on a first correlation between the first channel signal and the downmixed signal and a second correlation between the second channel signal and the downmixed signal, a value of an identification flag, wherein the identification flag comprises one bit to indicate that the initial reverberation gain parameter of one of the first channel signal or the second channel signal needs to be adjusted;

quantize, based on the downmixed signal, the initial reverberation gain parameter, and the value of the identification flag, the first channel signal and the second channel signal to obtain a quantized first channel signal and a quantized second channel signal; and write, into a bitstream, the quantized first channel signal and the quantized second channel signal.

15. The encoder of claim 14, wherein the first correlation is a first energy correlation between a first energy of the first channel signal and a second energy of the downmixed signal, or wherein the second correlation is a second energy correlation between a third energy of the second channel signal and the second energy.

16. The encoder of claim 15, wherein when executed by the at least one processor, the programming instructions further cause the encoder to:

obtain first absolute values of first difference values between the first energy and the second energy at a plurality of frequency bins;

obtain a first sum of the first absolute values as the first energy correlation;

obtain second absolute values of second difference values between the third energy and the second energy at the plurality of frequency bins; and obtain a second sum of the second absolute values as the second energy correlation.

17. The encoder of claim 16, wherein when executed by the at least one processor, the programming instructions further cause the encoder to obtain, based on a larger one of the first sum and the second sum, the value of the identification flag, and wherein the value of the identification flag indicates which of the first channel signal or the second channel signal corresponds to the larger one.

18. The encoder of claim 17, wherein when executed by the at least one processor, the programming instructions further cause the encoder to:

obtain, based on the first sum and the second sum, an attenuation factor configured to adjust the initial reverberation gain parameter of the larger one of the first channel signal or the second channel signal;

quantize the attenuation factor to obtain a quantized attenuation factor; and write, into the bitstream, the quantized attenuation factor.

19. The encoder of claim 17, wherein when executed by the at least one processor, the programming instructions further cause the encoder to:

obtain, based on the first sum and the second sum, a plurality of attenuation factors, wherein each of the plurality of attenuation factors corresponds to at least one subband of the larger one of the first channel signal or the second channel signal, and wherein each of the at least one subband corresponds to only one attenuation factor;

quantize the plurality of attenuation factors to obtain a plurality of quantized attenuation factors; and write, into the bitstream, the plurality of quantized attenuation factors.

20. The encoder of claim 15, wherein when executed by the at least one processor, the programming instructions further cause the encoder to determine, based on the first energy and the third energy, the second energy.

* * * * *